United States Patent
Freeman et al.

(10) Patent No.: US 7,899,236 B2
(45) Date of Patent: Mar. 1, 2011

(54) EVALUATION OF OPTICAL DISTORTION IN A TRANSPARENCY

(75) Inventors: Philip L. Freeman, Maryland Heights, MO (US); Michael P. Gleason, Edwardsville, IL (US); Matthew M. Thomas, Florissant, MO (US); Michael S. Dixon, Saint Louis, MO (US); Robert B. Pless, Saint Louis, MO (US); William D. Smart, Clayton, MO (US)

(73) Assignee: The Boeing Company, Chicago, IL (US)

( * ) Notice: Subject to any disclaimer, the term of this patent is extended or adjusted under 35 U.S.C. 154(b) by 1012 days.

(21) Appl. No.: 11/558,406

(22) Filed: Nov. 9, 2006

(65) Prior Publication Data

US 2010/0086191 A1    Apr. 8, 2010

(51) Int. Cl.
    *G06K 9/00*    (2006.01)
(52) U.S. Cl. ....................................................... 382/141
(58) Field of Classification Search .................. 382/141, 382/142, 150, 151, 152
    See application file for complete search history.

(56) References Cited

U.S. PATENT DOCUMENTS

| 4,776,692 A | | 10/1988 | Kalawsky | |
|---|---|---|---|---|
| 5,694,479 A | * | 12/1997 | Guering et al. | 382/141 |
| 5,724,140 A | * | 3/1998 | Haywood | 356/600 |
| 6,613,483 B2 | * | 9/2003 | Fujimoto | 430/5 |

OTHER PUBLICATIONS

Standard Test Method for Measuring Optical Angular Deviation of Transparent Parts, 2002, pp. 1-8, ASTM International, West Conshohocken, PA.
Standard Practice for Optical Distortion and Deviation of Transparent Parts Using the Double-Exposure Method, 2003, pp. 1-4, ASTM International, West Conshohocken, PA.

* cited by examiner

*Primary Examiner* — Brian Q Le
*Assistant Examiner* — Edward Park
(74) *Attorney, Agent, or Firm* — Tung & Associates

(57) ABSTRACT

A system for evaluating optical distortion in an aircraft transparency, such as a windshield, is disclosed. The system utilizes high resolution digital images (a reference image and a test image) of a test grid structure having a pattern of visible index locations. In one embodiment, the test image is taken through the transparency under test, and the reference image is taken without the transparency. The two images are processed and analyzed by a computing device to determine displacement of each index location, relative to the reference image. The displacement data is further processed to obtain vector divergence field data that represents a quantitative measurement of the optical distortion. The optical distortion measurement data is then rendered in a suitable format that allows the transparency to be rated against certain quality criteria.

26 Claims, 18 Drawing Sheets

EVALUATION OF OPTICAL DISTORTION IN A TRANSPARENCY

TECHNICAL FIELD

Embodiments of the present invention relate generally to the testing of optical quality of transparencies such as aircraft windshields. More particularly, embodiments of the present invention relate to techniques and technologies for the testing of optical distortion in aircraft transparencies.

BACKGROUND

Aircraft transparencies such as windshields and canopies are usually designed to provide a relatively distortion-free view for the pilot. Optical acceptance of aircraft transparencies is very subjective. Historically, acceptance relies on a controlled visual assessment of the transparency against a grid board at the facility of the supplier, vendor, or manufacturer, as part of the buyer's acceptance process. The pilot, who typically has no set acceptance process or assessment criteria, also judges acceptability of the windshield during acceptance flights of the aircraft. This subjective acceptance process has created numerous problems with aircraft delivery, and is a major factor in overall cost of the transparency.

FIG. 1 is a diagram that illustrates a transparency test grid 100 and an aircraft windshield 102 through which test grid 100 is viewed. FIG. 1 depicts the "pilot's eye" view through windshield 102. In accordance with ASTM Standard F733-90, the optical acceptance process for transparencies is a controlled viewing against a grid (i.e., test grid 100) of one-inch squares. Parameters such as the distance to test grid 100, lighting conditions, viewing positions, and viewing angles are controlled during acceptance testing. Supplier, buyer, and government personnel review the transparency prior to acceptance and shipment to the buyer facility for installation. This assessment is controlled but subjective, and acceptance levels can vary from individual to individual. The free form manufacturing process of aircraft windshields and canopies may contribute to optical variability from windshield to windshield and canopy to canopy. Typically, the source inspector will develop an eye for "typical or acceptable" optical quality expected from the process, over a period of time. This acceptance level determines how many transparencies will be accepted or rejected according to the process optical distribution curve. Where this acceptance level is drawn is the major factor in determining scrap numbers and therefore windshield costs.

Source inspectors assess optical quality using visual cues such as perceived grid line movement and bending, when moving their head in a prescribed manner. Pilots (the ultimate subjective judges) will accept and reject transparencies by gut reaction and experience without any controlled evaluation techniques. Source inspectors are typically stable in the job while acceptance pilots may come and go with various levels of acceptance, which the source inspectors may react to. Progression is usually to move the acceptance levels higher and higher to avoid on-aircraft pilot rejections. This typically increases rejections and cost, and sometimes slows windshield deliveries to levels below production requirements.

While windshield acceptance is weighted largely by visual review, photographic evaluations are also performed against test grid 100 to evaluate optics. Typically, a camera is set at a specified location and double or triple exposures are taken as the windshield is translated and rotated to different positions. This procedure is described in ASTM Standard F733-90, the relevant content of which is incorporated by reference herein. This double exposure technique is intended to duplicate the movement of the evaluator's head during optical evaluation. Measurements taken from the photographs, such as gridline thickness variation (i.e., apparent growth or shrinkage of the thickness of gridlines caused by the double exposure), and slopes (i.e., variations from the ideal horizontal and vertical gridline orientations) can be identified and measured by hand, however, such results are hit and miss and hard to discern. Moreover, correlation of this data to actual optical quality is uncertain. Consequently, while the double exposure technique is a good method to judge overall optical quality, it does not provide an objective evaluation of actual optical characteristics.

Furthermore, existing testing methodologies for aircraft transparencies do not detect optical distortions that are created during subsequent assembly of the aircraft or optical distortions that are induced by external forces applied to the transparency after the transparency is installed in the aircraft and/or external forces that may be applied to the transparency during flight.

BRIEF SUMMARY

Techniques and technologies as described herein can be utilized to evaluate optical distortion characteristics of an aircraft transparency. An embodiment described herein develops a photographic method of evaluation into a meaningful and objective test of optical quality. The embodiment employs high resolution digital photographs and manipulation of the captured image data with processing algorithms that identify and quantify optical quality characteristics. A system embodiment described herein processes the optical data and represents that data in a statistically significant and visually interpretable manner.

The techniques and technologies described herein provide an objective acceptance criteria for aircraft transparencies, where the criteria can be based on physiological pilot requirements. The testing methodology results in objective and repeatable results that ultimately can control manufacturing costs.

The above and other aspects of embodiments of the invention may be carried out by a method for evaluating optical distortion in a transparency. The method involves: obtaining an electronic reference image of a structure having a plurality of visible index locations, the electronic reference image being obtained from a fixed imaging location relative to the structure; obtaining an electronic test image of the structure, the electronic test image being obtained from the fixed imaging location and through a transparency under test; computing displacement characteristics for the visible index locations, the displacement characteristics being based upon reference positions of the visible index locations captured in the electronic reference image and corresponding test positions of the visible index locations captured in the electronic test image; and generating optical distortion measurement data for the transparency under test, the optical distortion measurement data being based upon the displacement characteristics.

The above and other aspects of embodiments of the invention may be carried out by a system for evaluating optical distortion in a transparency. The system includes a digital imaging device configured to obtain an electronic reference image of a structure having a plurality of visible index locations, and an electronic test image of the structure, which is taken through a transparency under test. The electronic reference image and the electronic test image are both obtained from a fixed imaging location relative to the structure. The system also includes a computing device configured to receive the electronic reference image and the electronic test image. The computing device includes a processor having processing logic configured to analyze the electronic reference image and the electronic test image to generate optical distortion measurement data for the transparency under test based upon computed displacement characteristics of test positions of the visible index locations captured in the electronic test image.

The above and other aspects of embodiments of the invention may also be carried out by computer-readable media having computer-executable instructions that carry out the techniques and methods described herein.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of transparency configurations and that the aircraft windshield application described herein is merely one exemplary application of an embodiment of the invention.

Various embodiments may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

For the sake of brevity, conventional techniques and technologies related to digital signal processing, digital imaging, aircraft transparency manufacturing, computer architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 4:
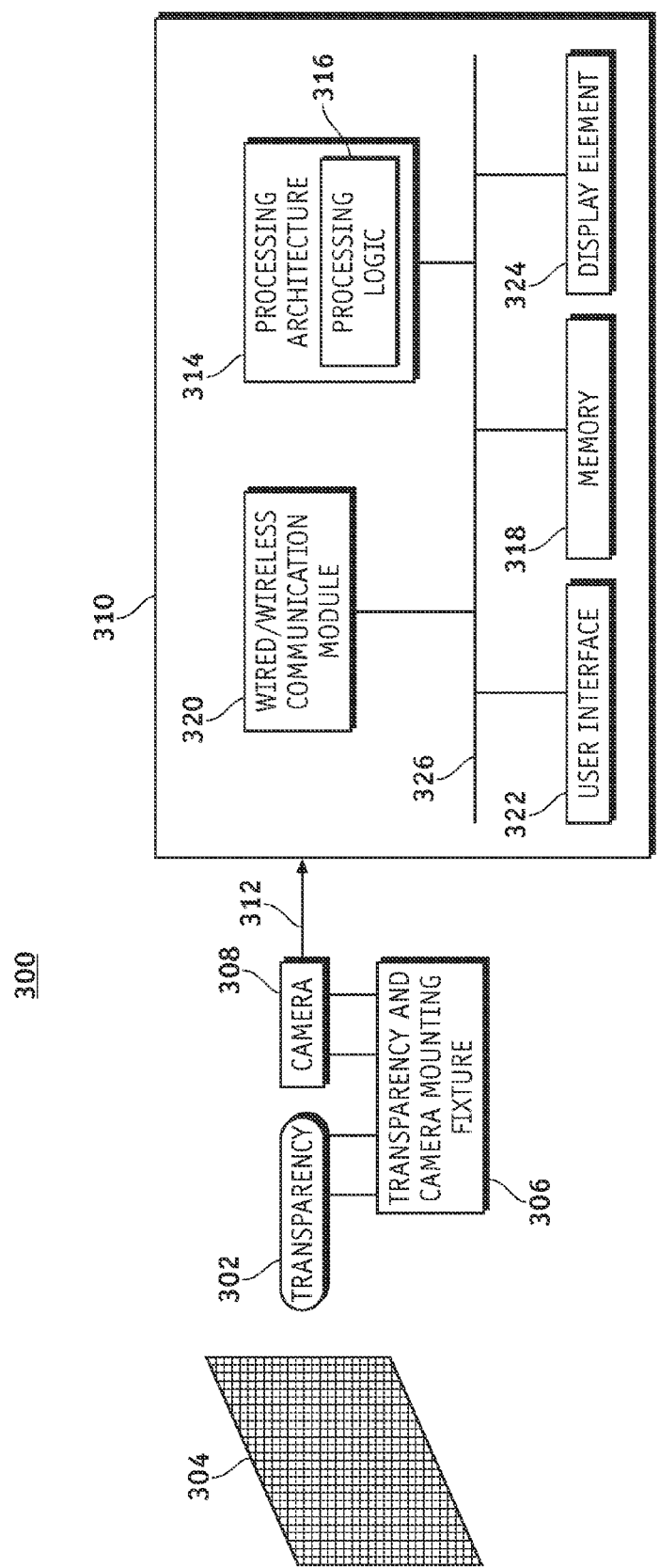
FIG. 4 is a schematic representation of a system for evaluating optical distortion of a transparency.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 4 depicts one example arrangement of elements, additional intervening elements, devices, features, or components may be present in an embodiment of the invention (assuming that the functionality of the circuit is not adversely affected).

Systems and methods according to embodiments described herein utilize a high resolution digital imaging device (e.g., a high quality digital camera of sufficient resolution) to analyze grid line "movement" caused by the transparency under test. The evaluation can leverage existing test fixtures and various aspects of current testing procedures. According to the current ASTM F733-90 procedure, a windshield is placed at the proper installation angle with respect to the design eye where a camera is located. The transparency is photographed as it is rolled right and left of centerline and a double exposed image is created to allow assessment of optical quality. A system embodiment as described herein can utilize existing tooling and fixtures that are designed to locate the windshield in the desired testing position. In contrast to the traditional testing method, however, movement of the holding fixture itself and movement of the transparency within the holding fixture is minimized. As described in more detail below, the system embodiment obtains a reference image of the grid and a test image of the grid as viewed through the transparency under test. Both images are taken with the digital camera in the same fixed position relative to the grid. Moreover, the transparency under test need not be moved because the new methodology does not rely upon a double exposure technique.

The digital photographs serve as inputs to a suitably configured computing device for processing by an application program that is designed to assess optical quality based upon information captured in the digital photographs. Keying on the intersecting grid points, each intersection point is assigned an X and Y coordinate for each photograph. A suitable algorithm computes the optical data of interest by comparing the X and Y coordinates from a theoretical perfect windshield as well as the various windshield positions photographed. An initial simple approach would be to determine line of sight deviation from a theoretical perfect windshield, (developed by ray trace analysis) by comparing the theoretical X and Y coordinates to a photograph taken through the windshield from the design eye point of view. By comparing the X and Y coordinates from one transitional or rotational point to the other transitional point or rotational point the change in the X direction with respect to the Y direction or the slopes can be calculated. This slope or first derivative is a measurement of windshield magnification an important optical effect found to be important in landing aircraft. Moreover, the second derivative also has an important relationship to the optical quality of the transparency. In certain embodiments, the evaluation system calculates the rate of change of these slopes (point to point variation, or second derivative) to yield a measurement of optical distortion.

As one example of the first derivative and second derivative effects discussed in the previous paragraph, aircraft carrier landing operations for the F/A-18 aircraft can be delicate because the landing deck may be in constant motion. The F/A-18 pilot uses a ball on the carrier as a visual marker for landing. Seeing this ball through a windshield plagued by first derivative problems is not good, but often the pilot can mentally compensate for these problems. On the other hand, seeing this ball through a windshield plagued by second derivative problems can result in a movement-prone sight, for which mental compensation is much more difficult for a pilot already preoccupied with the challenge of a deck landing.

A registration or indexing technique can be utilized to ensure that intersection points from each image can be counted to correspond to one another for calculation purposes. This could be done by selecting and marking one grid point as the zero point from which the algorithm will count all points to obtain positional differences.

Calculated data can be presented in various manners, including statistical numbers, and visual image data such as radar cross section (RCS), images that resemble color-coded weather maps, and images that resemble thermographic color images. Of course, the particular manner in which the optical characterization data is presented to the evaluator may vary from one system to another to suit the needs and preferences of the given application, evaluator, or system. Moreover, the system can grow and be modified to accommodate the evaluation of different factors required for acceptable transparencies.

In practical embodiments, the data collected on each windshield is correlated with actual acceptance criteria. This can be accomplished over time as windshields are accepted and rejected. Another approach would be to perform a human factors study. For example, several pilots in a simulator, each performing several flight tasks, can be evaluated for performance of these tasks using windshields of various optical quality. Alternatively, inspectors may perform a review of a wide range (quality-wise) of transparencies, with a certain number of inspectors reviewing a specified set of transparencies using the conventional viewing fixture and gridboard. Such studies could satisfy the requirements of certain government entities or agencies for purposes of determining minimal acceptance levels and the type of data to be extracted for acceptance.

Notably, although the optical testing and evaluation described herein is mainly applicable to windshields (since optics are more important for forward facing transparencies), the testing methodology can also be utilized on canopies and other transparency applications. As used herein, the term "aircraft" is intended to include airplanes, hovercraft, rotorcraft (e.g., helicopters), and any airborne vehicle. Moreover, the techniques and technologies described herein can be adapted to any vehicle transparency (e.g., automobiles, motorcycles, boats, etc.), and are not limited to aircraft applications.

Figure 2:
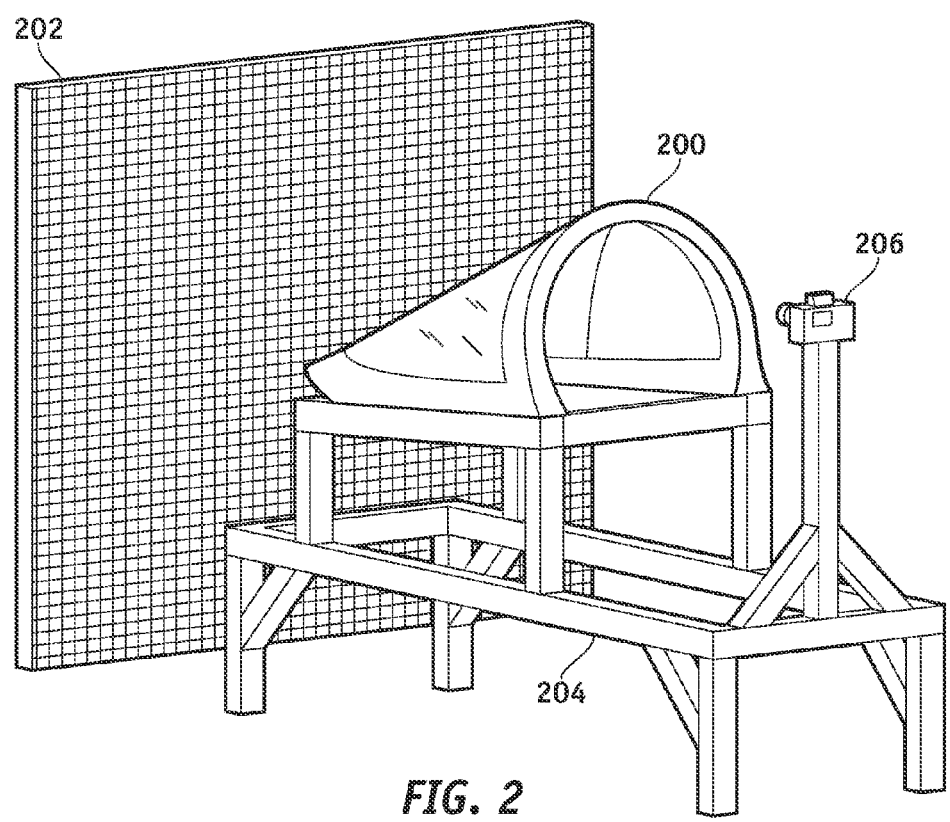
FIG. 2 is a perspective view of a testing environment suitable for optical distortion evaluation of an aircraft windshield.
Figure 3:
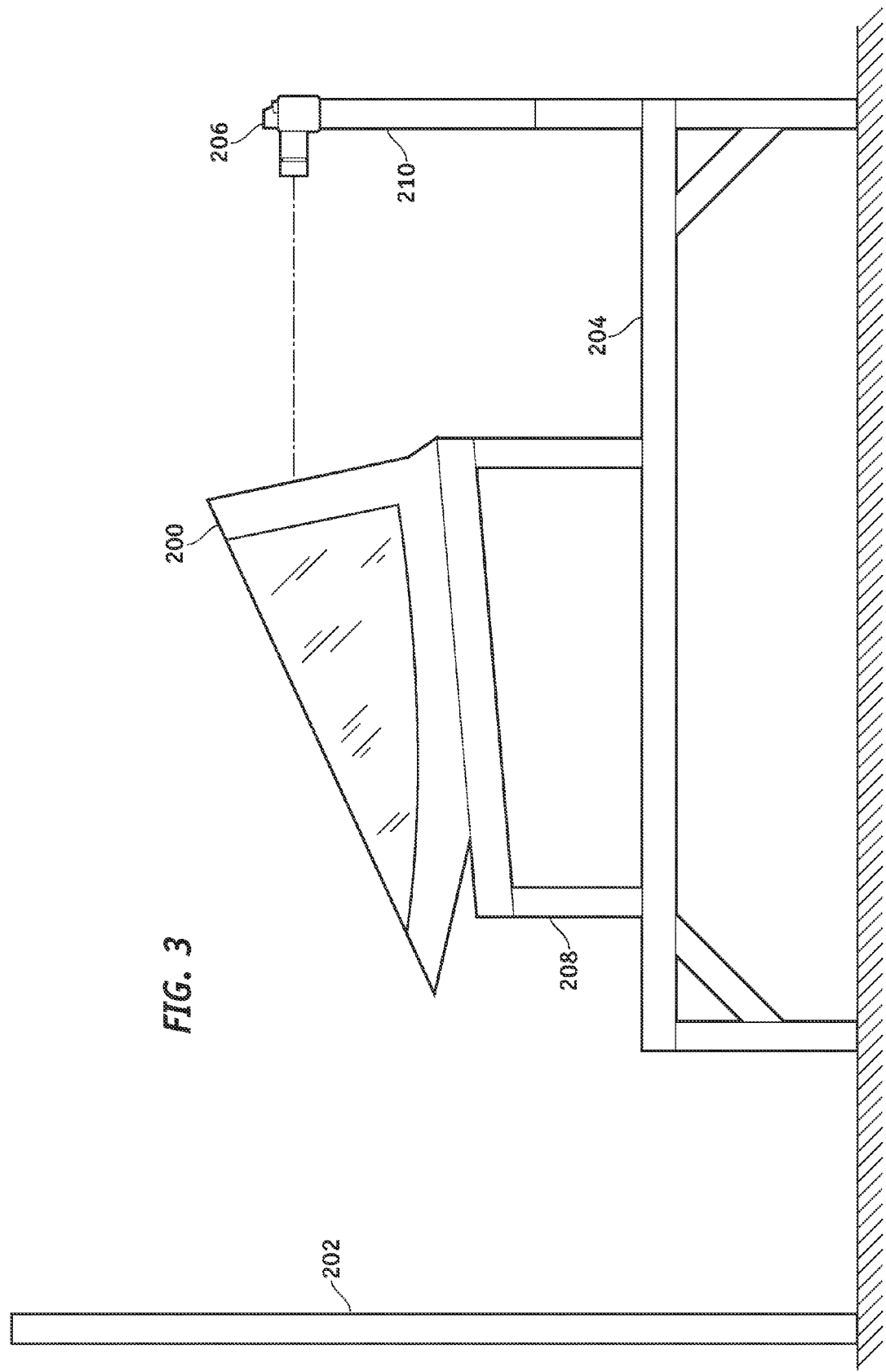
FIG. 3 is a side view of a testing environment suitable for optical distortion evaluation of an aircraft windshield.

FIG. 2 is a perspective view of a testing environment suitable for optical distortion evaluation of an aircraft windshield 200, and FIG. 3 is a side view of a testing environment suitable for optical distortion evaluation of aircraft windshield 200. A system for evaluating optical distortion of a transparency, such as windshield 200, can be deployed in such an environment. An exemplary testing system may include, without limitation: a suitably configured structure 202 having a plurality of visible index locations; a mounting fixture 204; a digital imaging device 206; and a suitably configured computing device (not shown in FIG. 2 or FIG. 3).

Structure 202 is suitably configured to maintain a plurality of visible index locations in a desired pattern or arrangement. In this embodiment, structure 202 defines a test grid having a plurality of intersection points arranged in a square pattern. As an example, structure 202 may be any of the various grid boards as set forth in ASTM Standard F733-90. Structure 202 is preferably held in a fixed position relative to mounting fixture 204 and digital imaging device 206. Here, structure 202 is held in a vertical orientation relative to the surface (e.g., the floor) upon which mounting fixture 204 rests.

Mounting fixture 204 provides a stable and rigid mounting location for both windshield 200 and digital imaging device 206. In practice, mounting fixture 204 may be secured to the floor to prevent it from moving during the testing procedure. Mounting fixture 204 includes a transparency mounting feature 208 and a camera mounting feature 210. These mounting features are designed such that both windshield 200 and digital imaging device 206 are held in respective fixed and stable positions throughout the imaging procedure. Consequently, the relative locations of structure 202, mounting fixture 204, windshield 200, and digital imaging device 206 remain fixed during the imaging procedure. As described in more detail below, images may be taken with windshield 200 in place, with windshield 200 removed, with windshield 200 in various stages of assembly, and/or with windshield 200 subjected to various loading conditions.

In the system embodiments described herein, digital imaging device 206 is a high resolution and high quality digital camera. The megapixel resolution of digital imaging device 206, the type of camera body, the lens type, the digital image file format, and the digital imaging settings may vary from one system to another to suit the needs of the particular application. In one embodiment, digital imaging device 206 has a resolution of at least 14 megapixels. Digital imaging device 206 is preferably located at or near the design eye position such that it captures images that correspond to the pilot's vantage point. As described in more detail below, digital imaging device 206 can capture electronic reference images and electronic test images as needed in connection with the optical distortion evaluation procedure. As explained above, the electronic images are obtained from a fixed imaging location relative to structure 202, and electronic test images are taken through the given transparency under test, e.g., windshield 200.

FIG. 4 is a schematic representation of a system 300 for evaluating optical distortion of a transparency 302 such as an aircraft windshield. System 300 may, for example, be deployed in the testing environments depicted in FIG. 2 and FIG. 3. In this embodiment, system 300 includes a grid structure 304, a mounting fixture 306, a digital camera 308, and a computing device 310. Grid structure 304, mounting fixture 306, and digital camera 308 may be configured as described above in the context of FIG. 2 and FIG. 3. Digital camera 308 and computing device 310 are suitably configured to accommodate transfer of electronic image files from digital camera 308 to computing device 310 via a suitable data communication link 312. This data communication link 312 may be a wired link, a wireless link, or a combination thereof. For example, data communication link 312 may be realized with a suitably configured USB cable.

FIG. 4 includes a simplified schematic representation of an example computing device 310 that is suitable for implementing an embodiment of an optical distortion evaluation system. Computing device 310 may be implemented in any suitable form factor, including, without limitation: a personal computer, a server computer, a portable computer, a personal digital assistant, a networked computer, or a distributed computing device. Computing device 310 and certain aspects of the example embodiments may be described in the general context of computer-executable instructions, such as program modules, application code, or software executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Computing device 310 typically includes at least some form of computer readable media. Computer readable media can be any available media that can be accessed by computing device 310 and/or by applications executed by computing device 310. By way of example, and not limitation, computer readable media may include computer storage media and associated communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 310. Communication media typically embodies and transmits computer readable instructions, data structures, program modules or other data stored in computer storage media in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 310 generally includes a processing architecture 314 (e.g., one or more processors) having suitably configured processing logic 316, a suitable amount of memory 318, at least one communication module 320, user interface features 322, and a display element 324. These elements may be interconnected using a data/control bus 326 or any suitably configured interconnection architecture or arrangement.

Processing architecture 314 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Memory 318 may be volatile (such as RAM), non-volatile (such as ROM, flash memory, etc.) or a combination thereof. In this regard, memory 318 can be coupled to processing architecture 314 such that processing architecture 314 can read information from, and write information to, memory 318. In the alternative, memory 318 may be integral to processing architecture 314. As an example, processing architecture 314 and memory 318 may reside in an ASIC. Computing device 310 may also have additional storage (removable and/or non-removable) including, but not limited to, magnetic or optical disks or tape. Memory 318, removable storage, and non-removable storage are all examples of computer storage media as defined above.

Communication module 320, which may utilize wired and/or wireless data communication interfaces and protocols, allows computing device 310 to communicate with other devices, such as digital camera 308. In embodiments described herein, communication module 320 may include, without limitation, suitably configured interfaces that allow computing device 310 to communicate with a network such as the Internet, external databases, external memory devices, and the like. Communication module 320 may be associated with the handling of communication media as defined above.

Computing device 310 may also include or communicate with user interface features 322 such as a keyboard, mouse or other pointing device, pen, voice input device, touch input device, etc. Computing device 310 may also include or communicate with output device(s) such as display element 324, speakers, a printer, or the like. All of these components are well known in the art and need not be discussed at length here.

Figure 5:
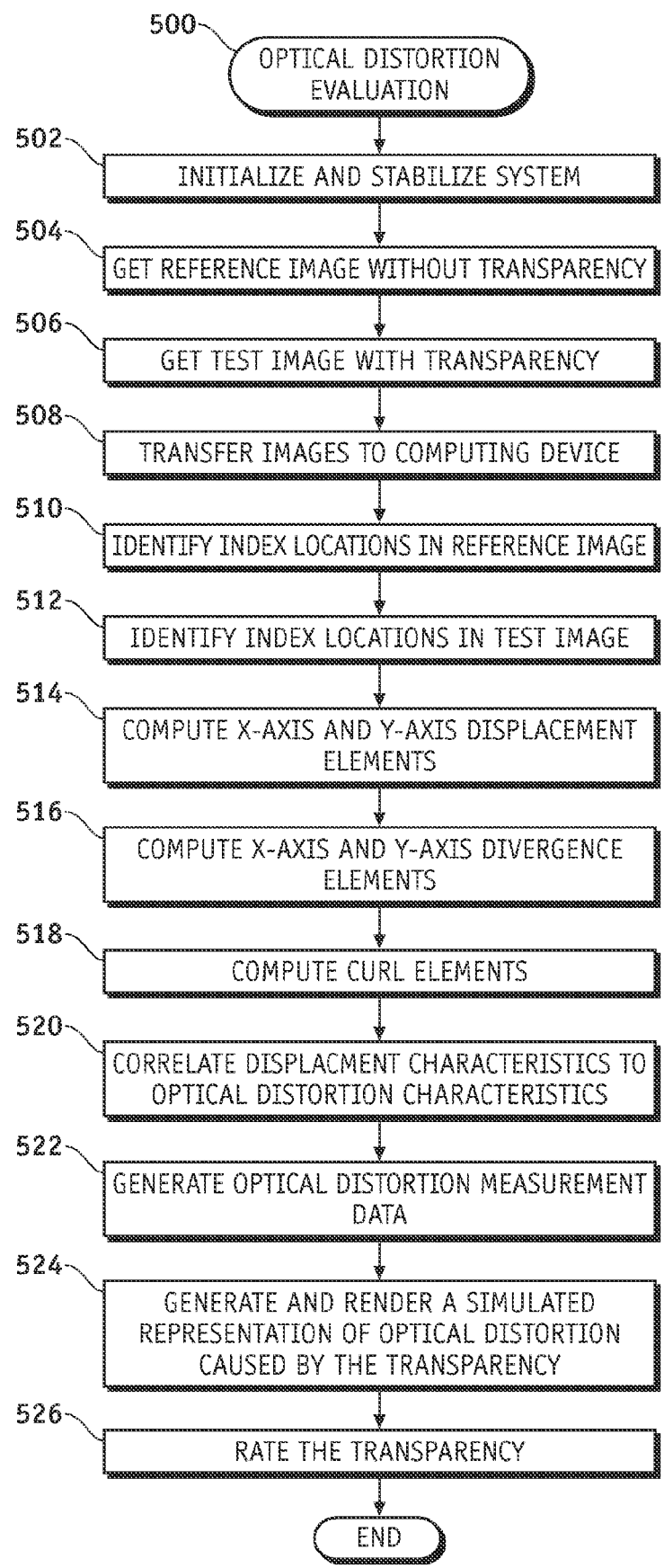
FIG. 5 is a flow chart that illustrates an optical distortion evaluation process that may be performed by the system shown in FIG. 4.

FIG. 5 is a flow chart that illustrates an optical distortion evaluation process 500 that may be performed by system 300. Process 500 assumes that the deployed system has already been configured to support the various image capturing and processing procedures and techniques described herein. Some of the tasks performed in connection with process 500 may be performed by software, hardware, firmware, or any combination thereof. For illustrative purposes, the following description of process 500 may refer to elements mentioned above in connection with FIGS. 1-4. In embodiments of the invention, portions of process 500 may be performed by different elements of the described system, e.g., a digital imaging device or a computing device. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Optical distortion evaluation process 500 may begin by initializing and physically stabilizing the system (task 502). Due to the high resolution digital imaging techniques employed by process 500, the testing environment and test fixture are prepared and readied to minimize vibration, movement, and shaking of the test fixture, the digital camera, and the test grid. During task 502 the digital camera and testing environment may also be prepared for image-taking. For example, the image settings, position, and focus of the digital camera may be determined and entered, and the lighting in the testing environment may be measured and adjusted as necessary. In addition, black cloth can be positioned in strategic locations to minimize reflections from the transparency that might otherwise introduce noise into the test results.

FIG. 5 illustrates one exemplary testing procedure where a test image of a transparency under test is compared to a reference image with no transparency in place (other testing procedures are described below). Accordingly, optical distortion evaluation process 500 may eventually capture or obtain an electronic reference image of the test grid structure without any transparency in place (task 504). In other words, the electronic reference image represents an unobstructed image of the test grid structure. This reference image is taken from a fixed imaging location relative to the test grid structure. For example, the digital camera may be located approximately ten to fifteen feet away from the test grid structure.

Optical distortion evaluation process 500 also acquires an electronic test image of the test grid structure with the transparency under test in place on the test fixture (task 506). The electronic test image represents an image of the test grid structure as viewed through the transparency under test. The electronic test image is also taken from the fixed imaging location relative to the test grid structure. Depending upon the selected test procedure, the transparency under test at this point in process 500 may be, without limitation: a "bare" transparency, i.e., an unframed component; a loosely framed transparency; or a framed and sealed transparency. Moreover, the transparency under test at this point in process 500 may be unloaded or it may be stressed to simulate any desired loading condition.

In one embodiment of optical distortion evaluation process 500, task 504 is performed before task 506. In such an embodiment, a second electronic reference image may be taken after the test image has been taken. The second electronic reference image is acquired after removing the transparency under test, and the second electronic reference image is taken from the same fixed imaging location. The second electronic reference image can be compared to the first electronic reference image as a quality control measure to ensure that the test environment and/or test fixture was not altered while the various images were being captured. For simplicity, FIG. 5 does not depict any tasks related to this reference checking aspect. Those skilled in the art will understand that the methodology of process 500 can be equivalently applied to compare the two reference images.

Eventually, the test and reference images are transferred to at least one computing device for processing (task 508). Referring to FIG. 4, the image files may be transferred via data communication link 312. In connection with task 508, the computing device obtains the electronic reference and test images and, thereafter, the computing device analyzes and processes the electronic reference and test images in the manner described herein to quantify the optical distortion characteristics of the transparency under test. In this embodiment, the computing device is suitably configured to generate optical distortion measurement data for the transparency under test, based upon computed displacement characteristics of test positions for the visible index locations of the test grid structure. The test positions analyzed by the computing device are captured in the electronic test and reference images.

Figure 1:
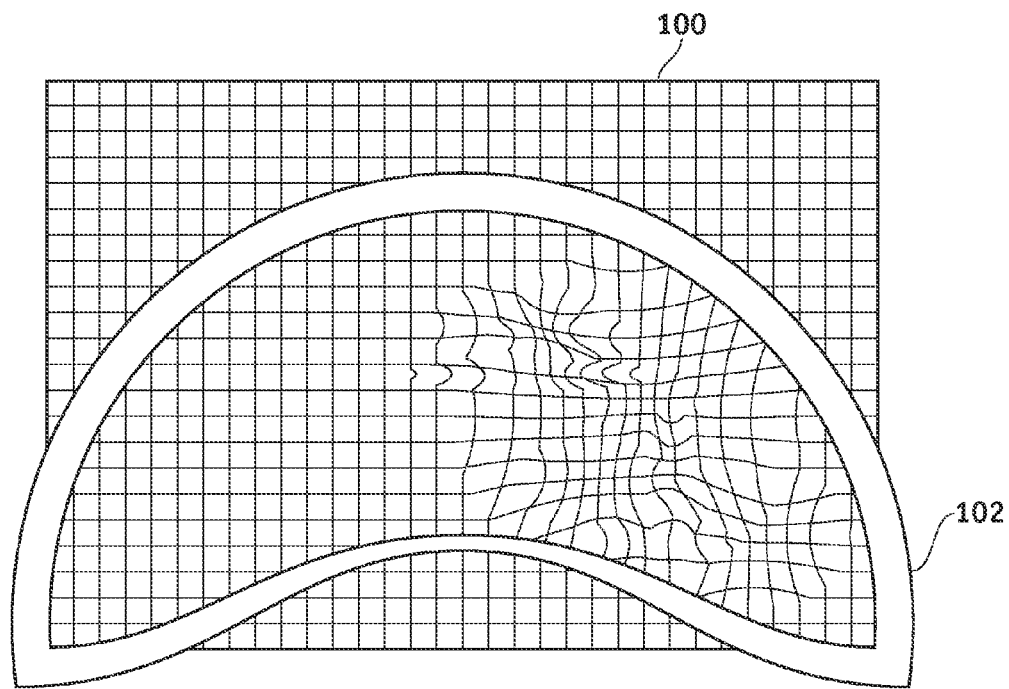
FIG. 1 is a diagram that illustrates a transparency test grid and an aircraft windshield through which the test grid is viewed.

In connection with the digital image processing, optical distortion evaluation process 500 may identify visible index locations in the electronic reference image (task 510) and identify the corresponding visible index locations in the electronic test image (task 512). For this example, the visible index locations correspond to gridline intersection points on the test grid structure. Referring to FIG. 1, the visible index locations on test grid 100 are the points where the vertical lines (e.g., strings) intersect the horizontal lines (e.g., strings). Process 500 identifies and correlates the index locations in the captured images so that it can compute the relative displacement characteristics for each grid point. In this regard, the displacement characteristics for the visible index locations are based upon the reference positions of the visible index locations as captured in the electronic reference image, along with the corresponding test positions of the visible index locations as captured in the electronic test image. Although not required, a practical embodiment may be configured to process only those grid points within the viewing area of the transparency under test. For example, referring to FIG. 1, process 500 may disregard grid points that are beyond the outer border of transparency 102. Alternatively, process 500 may compare grid points that are beyond the border of transparency 102 to quantify noise in the process or to otherwise serve as a quality check (ideally, the location of these grid points should be identical in both images).

Once optical distortion evaluation process 500 pinpoints the locations of the index locations to be analyzed, it proceeds to gauge both the magnitude and the direction of the grid point movements. FIG. 1 depicts the optical distortion in an exaggerated manner for ease of illustration; some of the grid lines are wavy and curved as viewed through transparency 102. These movements represent "optical displacements." With the optical displacement vectors quantified across the optical scope of the transparency, process 500 numerically determines the following items: (1) the x-component displacement derivative in the x-direction; (2) the x-component derivative in the y-direction; (3) the y-component derivative in the x-direction; and (4) the y-component derivative in the y-direction. For this example, the units of these derivatives are inches/inch (assuming that the test grid structure has a one inch square pattern of grid points). Positive derivative values indicate a growth in a given square of four gridline intersection points, while negative derivative values indicate a shrinkage in a given square of four gridline intersection points. The sum of the x-component displacement derivative in the x-direction and the y-component displacement derivative in the y-direction produces a scalar component known as the "divergence" (in inches/inch). It is this presentation of the divergence of the displacement vector field (as an optical distortion map) that best represents optical distortions within transparencies as pilots see them. For frame-induced or known-orthogonal-force-induced optical distortion examinations, simple magnitude change comparisons can be used.

In this embodiment, optical distortion evaluation process 500 calculates x-axis displacement elements ($g_x$) and y-axis displacement elements ($g_y$) for at least some of the visible index locations (task 514). In one preferred embodiment, task 514 calculates the displacement elements for each visible index location within the viewing area of the transparency under test, thus resulting in a truly useful assessment of the entirety of the transparency. Depending upon the spacing of the test grid and the size of the transparency under test, task 514 may consider thousands of index locations (e.g., 8000-8500 for an F/A-18 aircraft windshield). In contrast, the double exposure technique specified in ASTM Standard F733-90 involves only a small portion of the total viewing area. Notably, task 514 quantifies the displacement of the visible index locations within the viewing area of the transparency under test. In one practical embodiment that uses a tightened string matrix for the test grid structure, the image processing software of the computing device may need to be designed to contemplate the three-dimensional nature of the string intersection points, which can be captured by high resolution digital photography.

Figure 6:
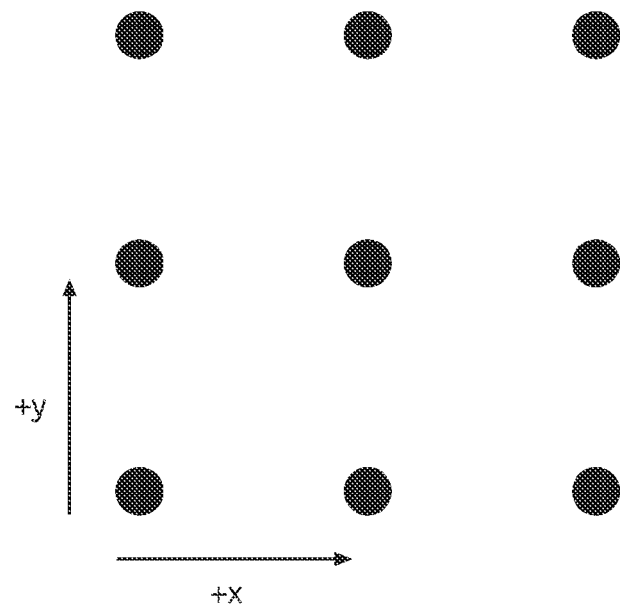
FIGS. 6-32 are diagrams that represent modes of gridline intersection behavior that may be detected and processed by the system shown in FIG. 4.
Figure 7:
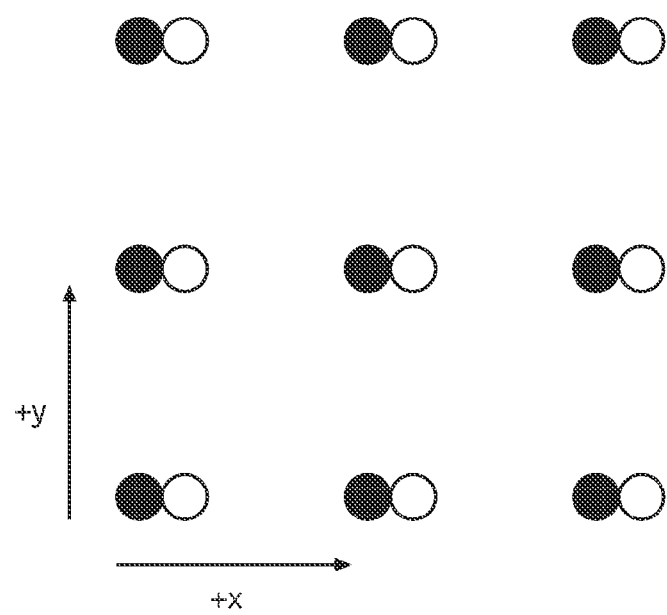
Figure 8:
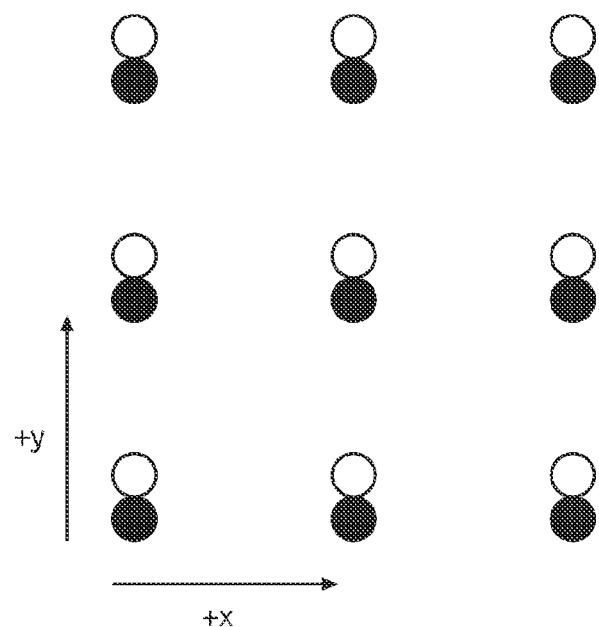
Figure 9:
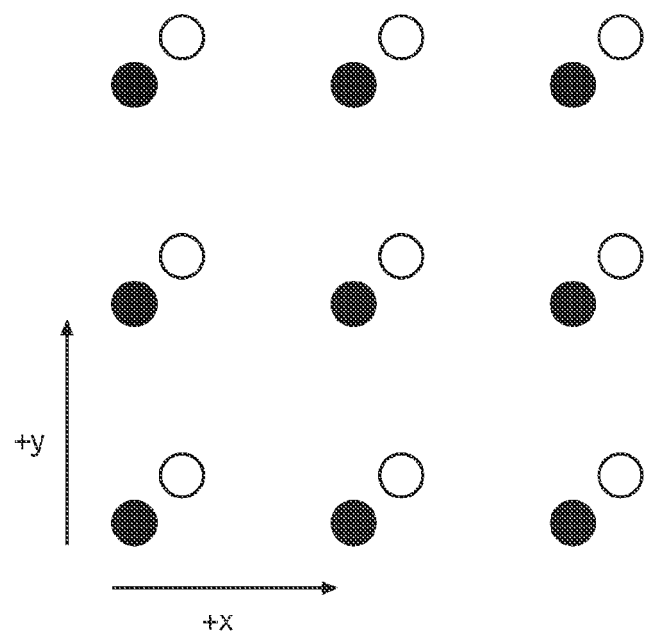

FIG. 6 is a diagram that depicts no x-axis displacement and no y-axis displacement. In other words, the grid points from the reference image correspond to the grid points from the test image, and process 500 detects no measurable displacement in either direction. In contrast, FIG. 7 is a diagram that depicts a nonzero x-axis displacement element and a zero y-axis displacement element, FIG. 8 is a diagram that depicts a nonzero y-axis displacement element and a zero x-axis displacement element, and FIG. 9 is a diagram that depicts a nonzero x-axis displacement element and a nonzero y-axis displacement element.

Optical distortion evaluation process 500 may also calculate x-axis divergence elements and y-axis divergence elements for at least some of the visible index locations (task 516). In one preferred embodiment, task 516 calculates divergence elements for each visible index location within the viewing area of the transparency under test. In the context of this example, the divergence elements represent partial derivatives of the displacement elements:

$$\frac{\partial g_x}{\partial x}; \text{ and } \frac{\partial g_y}{\partial y}.$$

Figure 10:
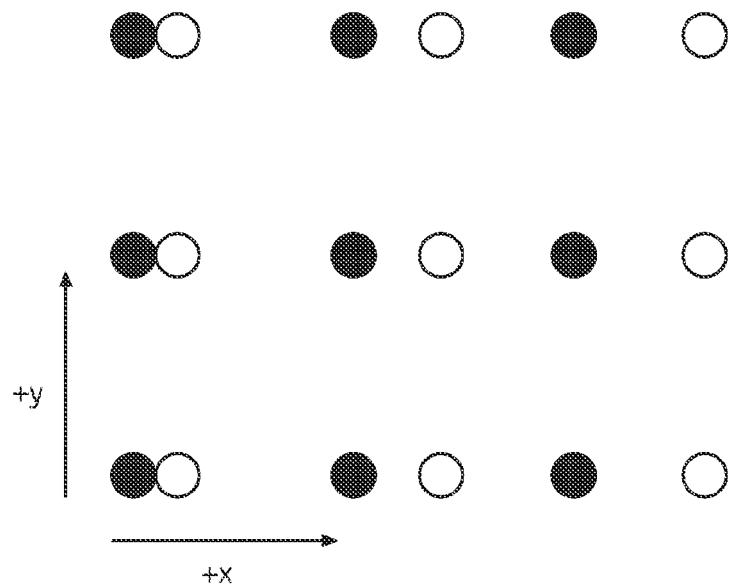
Figure 11:
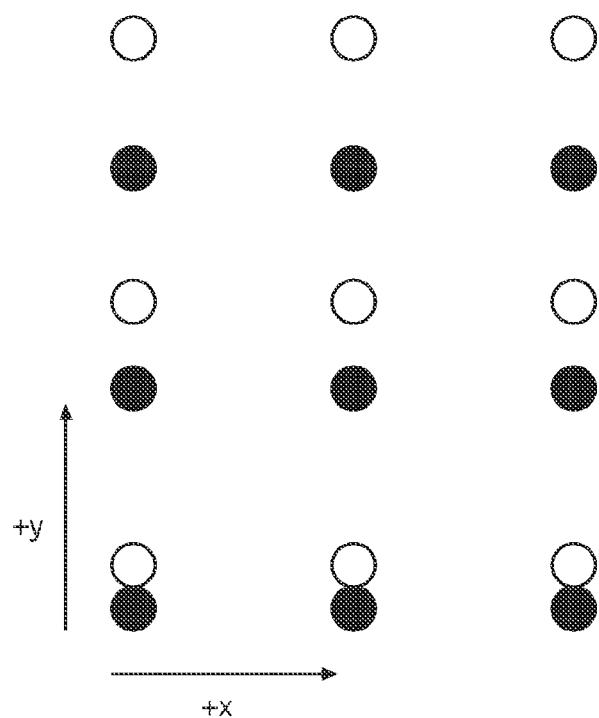

To illustrate this concept, FIG. 10 is a diagram that depicts a nonzero $$\frac{\partial g_x}{\partial x}$$

divergence element and a zero $$\frac{\partial g_y}{\partial y}$$

divergence element. In other words, the amount of x-axis displacement increases as the grid points progress in the x-direction. In contrast, FIG. 11 is a diagram that depicts a nonzero $$\frac{\partial g_y}{\partial y}$$

divergence element and a zero $$\frac{\partial g_x}{\partial x}$$

divergence element. In other words, the amount of y-axis displacement increases as the grid points progress in the y-direction. Process 500 utilizes divergence elements to compute the divergence characteristics of the transparency under test. The calculated divergence represents a primary optical property that corresponds to optical distortion caused by the transparency under test. Here, the calculated divergence is the sum of $$\frac{\partial g_x}{\partial x} \text{ and } \frac{\partial g_y}{\partial y}.$$

(a scalar quantity).

In layman's terms, the divergence represents how much the displacement field "diverges" from a reference point. It can diverge outwardly (growth; positive divergence) or inwardly (shrinkage; negative divergence). It is very likely that the physical factor influencing divergence is the concentration or density of the material in each ply of the transparency. Material refractive indices differing from the refractive index of air, as well as the shape and angle of the transparency, lead to a non-zero displacement field, but unevenness in the material ply density leads to a non-zero divergence. For positive divergence, the resulting image plots in one exemplary embodiment show a hue between green (zero divergence) and red (maximum growth), and what is seen through a transparency so plagued is an object appearing larger than it actually is. For negative divergence, the resulting image plots in this exemplary embodiment show a hue between green and blue (maximum shrinkage), and what is seen through that part of the transparency is an object appearing smaller than it actually is. In practice, some transparencies have regions of growth adjacent to regions of shrinkage—the line of transition between the two regions represents an optical discontinuity and, therefore, such transparencies are rejected quickly.

Optical distortion evaluation process 500 may also calculate curl elements for at least some of the visible index locations (task 518). In one preferred embodiment, task 518 calculates curl elements for each visible index location within the viewing area of the transparency under test. The curl elements may be derived from the displacement elements calculated in task 514. In the context of this example, the curl elements represent partial derivatives of the displacement elements:

$$\frac{\partial g_x}{\partial y}; \text{ and } \frac{\partial g_y}{\partial x}.$$

Figure 15:
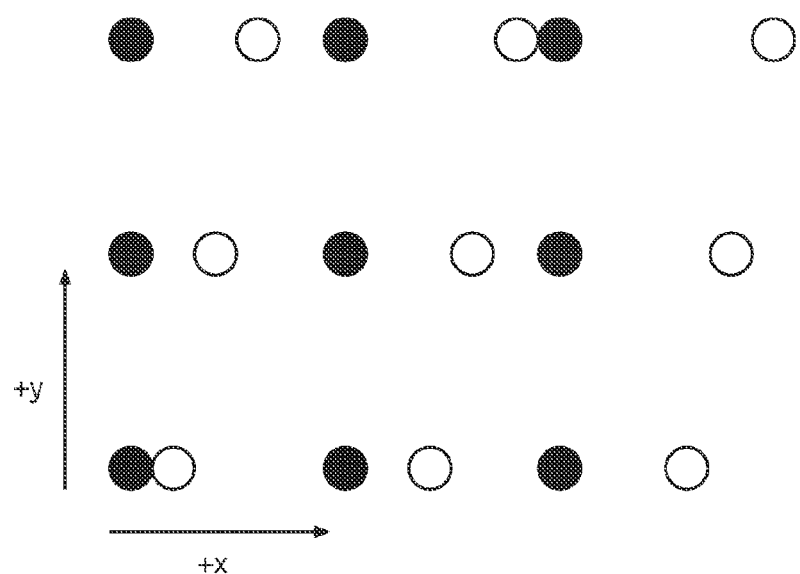
Figure 17:
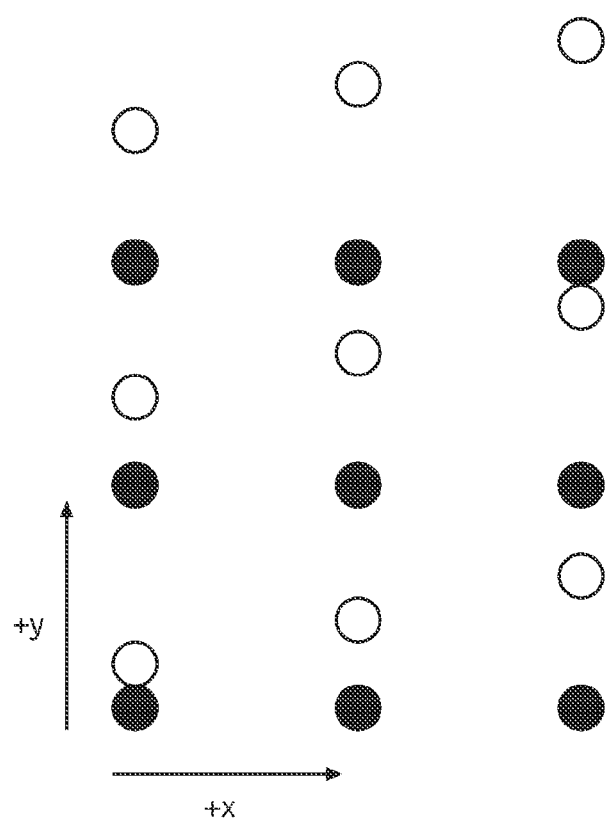

To illustrate this concept, FIG. 15 is a diagram that depicts a nonzero $$\frac{\partial g_x}{\partial y}$$

curl element and a zero $$\frac{\partial g_y}{\partial x}$$

curl element. In contrast, FIG. 17 is a diagram that depicts a nonzero $$\frac{\partial g_y}{\partial x}$$

curl element and a zero $$\frac{\partial g_x}{\partial y}$$

curl element. Process 500 may utilize curl elements to enhance the representation of the optical distortion caused by the transparency under test.

In practice, the curl elements $$\frac{\partial g_x}{\partial y} \text{ and } \frac{\partial g_y}{\partial x}$$

are small in magnitude relative to the divergence elements. Nonetheless, the system may utilize the curl elements (and any higher spatial derivatives of interest) when generating the test results. Unlike the divergence, the curl is a vector. For functionally two-dimensional applications such as this one, the curl corresponds to the following determinant:

$$\begin{vmatrix} \hat{i} & \hat{j} & \hat{k} \\ \frac{\partial}{\partial x} & \frac{\partial}{\partial y} & 0 \\ g_x & g_y & 0 \end{vmatrix} \text{ or } \left(\frac{\partial g_y}{\partial x} - \frac{\partial g_x}{\partial y}\right)\hat{k},$$

where $\hat{k}$ represents a unit vector perpendicular to the gridboard. This is how the curl is calculated from the partial derivatives (the displacement elements). Although the divergence of the displacement vector field corresponds very nicely to optical distortion in the transparency, the curl need not have any direct correspondence to a physical/optical phenomena.

In practice, optical distortion evaluation process 500 will correlate the computed displacement characteristics (e.g., the displacement elements, the divergence elements, and/or the curl elements) to optical distortion characteristics of the transparency under test (task 520). In this regard, process 500 may translate the data corresponding to the displacement characteristics into data, values, or quantities that better represent the optical distortion qualities of the transparency. This correlation may lead to the generation of appropriate optical distortion measurement data (task 522) for the transparency. In this regard, the optical distortion measurement data is based upon the computed displacement characteristics. Moreover, the optical distortion measurement data is influenced by the correlation performed during task 520. The optical distortion measurement data represents useable and readable information that has contextual meaning that can be interpreted by a pilot, a test technician, or other user of the system to assess the optical quality of the transparency.

Figure 33:
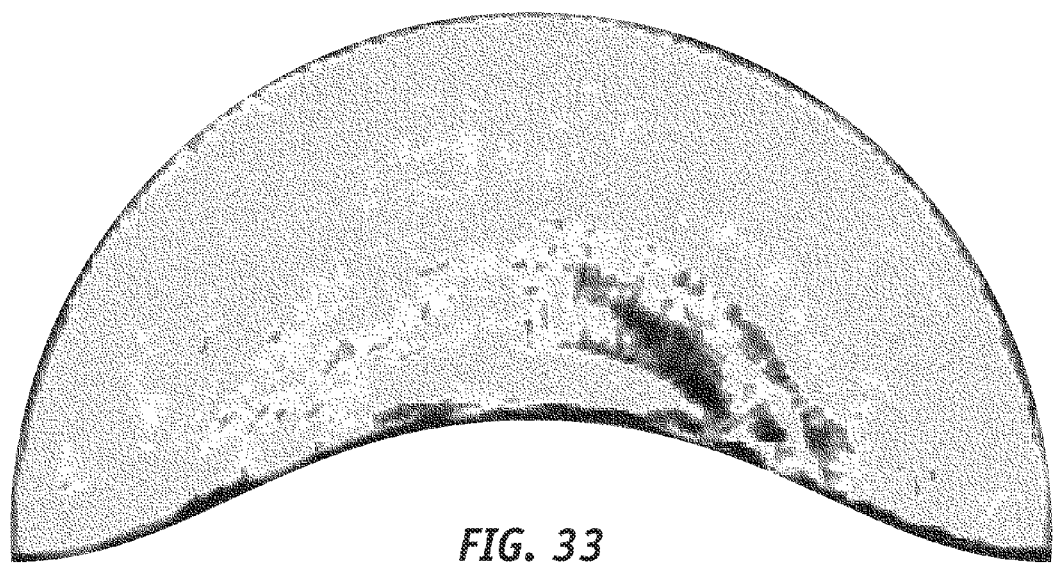
FIG. 33 is a diagram of a visual representation of optical distortion characteristics of a transparency.

In accordance with certain embodiments, optical distortion evaluation process 500 generates and renders a simulated representation of the optical distortion that is caused by the transparency under test (task 524). The simulated representation is based upon the optical distortion measurement data generated during task 522. In this example, the simulated representation is presented as a divergence field of the displacement vectors over the entire visible scope of the transparency under test. The simulated representation may be rendered on a display element, printed as a report, saved as a digital image file, played back in a suitable video or animation format, or the like. As one non-limiting example, FIG. 33 is a diagram of a visual representation of optical distortion characteristics of a transparency. This visual representation represents one format of a simulated representation that might be generated by task 524. For images such as that shown in FIG. 33, different colors and/or shading may represent areas of the transparency corresponding to different levels or amounts of optical distortion characteristics. For example, the darker regions of the transparency shown in FIG. 33 indicate relatively high optical distortion, while the lighter regions indicate relatively low optical distortion. An embodiment that processes many test images from different viewing angles may also be configured to generate an animated simulation that strives to emulate the "look and feel" of optical distortion as viewed by a person moving his or her viewing perspective through the transparency under test. In contrast to conventional techniques that simply analyze characteristics of photographs to obtain information that relates to optical distortion, process 500 obtains a direct quantitative measurement of optical distortion characteristics.

Ultimately, optical distortion evaluation process 500 can rate the transparency under test in response to the optical distortion measurement data (task 526). This rating may be automated or it may be based on some human involvement. Moreover, this rating may be based upon any desired selection or grading criteria. For example, process 500 may leverage historical human evaluation data that has been correlated to previous results such that the rating performed in task 526 is likely to emulate a subjective human evaluation. In practice, this rating scheme will strive to reject transparencies that exhibit excessive optical distortion.

In connection with the evaluation and rating of the results, the electronic image data, once processed, can be used to determine the acceptability of the transparency using artificial intelligence and/or machine learning techniques (such as neural network, evolutionary computing, and similar techniques). For example, the Iterative Dichotomiser 3 (ID3) algorithm may be used to generate a decision tree related to the acceptability or reject-worthiness of the transparency based on optical distortion. Other decision tree generating algorithms could be used, however, ID3 is well suited for this application because it accurately represents acceptance/rejection rates of human evaluators.

Optical distortion evaluation process 500 may perform similar processing to compare two reference images: one taken before the test image and one taken after the test image. In this regard, process 500 may compute displacement characteristics and measurement data for this comparison to determine whether any variations in the test environment or test fixture has caused the system to impart any optical distortion to the test image. If excessive optical distortion between the reference images is found, then the test results may be discarded and repeated after recalibrating and initializing the system.

As mentioned above, a system for evaluating optical distortion as described herein processes displacement information for the test grid intersection points and generates meaningful optical distortion measurement results from that displacement information. To better illustrate how this displacement information is considered, FIGS. 6-32 are diagrams that represent various modes of gridline intersection behavior that may be detected and processed by an evaluation system (such as system 300 shown in FIG. 4). Some of these diagrams were discussed above in connection with optical distortion evaluation process 500.

FIG. 6 is a diagram that depicts no x-axis displacement and no y-axis displacement relative to the grid points captured in the reference image. The relatively dark shaded points in FIGS. 7-32 correspond to these reference grid points. FIG. 6 corresponds to a condition where:

the x-axis displacement element, $g_x$, is zero;
the y-axis displacement element, $g_y$, is zero;
the x-axis divergence element, $$\frac{\partial g_x}{\partial x},$$

is zero;
the y-axis divergence element, $$\frac{\partial g_y}{\partial y},$$

is zero; and
both curl elements, $$\frac{\partial g_x}{\partial y} \text{ and } \frac{\partial g_y}{\partial x},$$

are zero.

The ideal condition depicted in FIG. 6 should be present in the invariant regions of the test images, i.e., areas that represent a clear path to the test grid without the transparency in the line of sight.

FIG. 7 is a diagram that depicts x-axis displacement, no growth, and no skew. FIG. 7 corresponds to a condition where:

$g_x>0$;
$g_y=0$; and $$\frac{\partial g_x}{\partial x}, \frac{\partial g_y}{\partial y}, \frac{\partial g_x}{\partial y}, \text{ and } \frac{\partial g_y}{\partial x}$$

are all zero.

FIG. 8 is a diagram that depicts y-axis displacement, no growth, and no skew. FIG. 8 corresponds to a condition where:

$g_x=0$;
$g_y>0$; and $$\frac{\partial g_x}{\partial x}, \frac{\partial g_y}{\partial y}, \frac{\partial g_x}{\partial y}, \text{ and } \frac{\partial g_y}{\partial x}$$

are all zero.

FIG. 9 is a diagram that depicts x-axis displacement, y-axis displacement, no growth, and no skew. FIG. 9 corresponds to a condition where:

$g_x>0$;
$g_y>0$; and $$\frac{\partial g_x}{\partial x}, \frac{\partial g_y}{\partial y}, \frac{\partial g_x}{\partial y}, \text{ and } \frac{\partial g_y}{\partial x}$$

are all zero.

FIG. 10 is a diagram that depicts x-axis displacement and displacement growth along the x-axis. FIG. 10 corresponds to a condition where:

$g_x>0$;
$g_y=0$;

$$\frac{\partial g_x}{\partial x} > 0; \text{ and}$$

$$\frac{\partial g_y}{\partial y}, \frac{\partial g_x}{\partial y}, \text{ and } \frac{\partial g_y}{\partial x}$$

are all zero.

FIG. 11 is a diagram that depicts y-axis displacement and displacement growth along the y-axis. FIG. 11 corresponds to a condition where:

$g_x=0$;
$g_y>0$;

$$\frac{\partial g_y}{\partial y} > 0; \text{ and}$$

$$\frac{\partial g_x}{\partial x}, \frac{\partial g_x}{\partial y}, \text{ and } \frac{\partial g_y}{\partial x}$$

are all zero.

Figure 12:
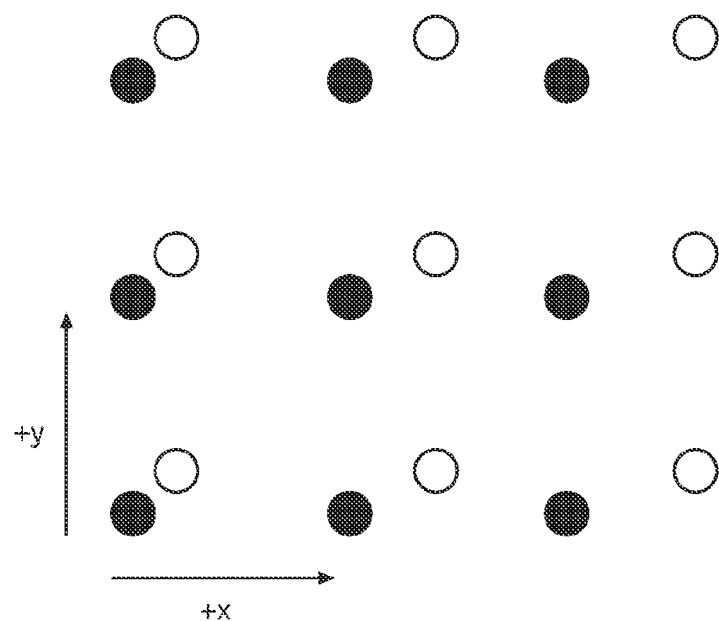

FIG. 12 is a diagram that depicts x-axis displacement, y-axis displacement, and x-displacement growth along the x-axis. FIG. 12 corresponds to a condition where:

$g_x>0$;
$g_y>0$;
$\partial g_x/\partial x>0$; and
$\partial g_y/\partial y$, $\partial g_x/\partial y$, and $\partial g_y/\partial x$ are all zero.

Figure 13:
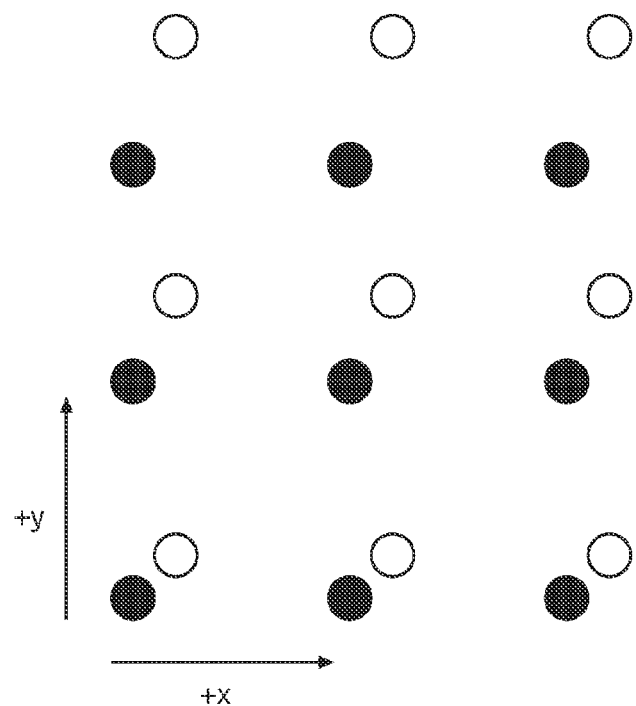

FIG. 13 is a diagram that depicts x-axis displacement, y-axis displacement, and y-displacement growth along the y-axis. FIG. 13 corresponds to a condition where:

$g_x>0$;
$g_y>0$;

$$\frac{\partial g_y}{\partial y} > 0; \text{ and}$$

$$\frac{\partial g_x}{\partial x}, \frac{\partial g_x}{\partial y}, \text{ and } \frac{\partial g_y}{\partial x}$$

are all zero.

Figure 14:
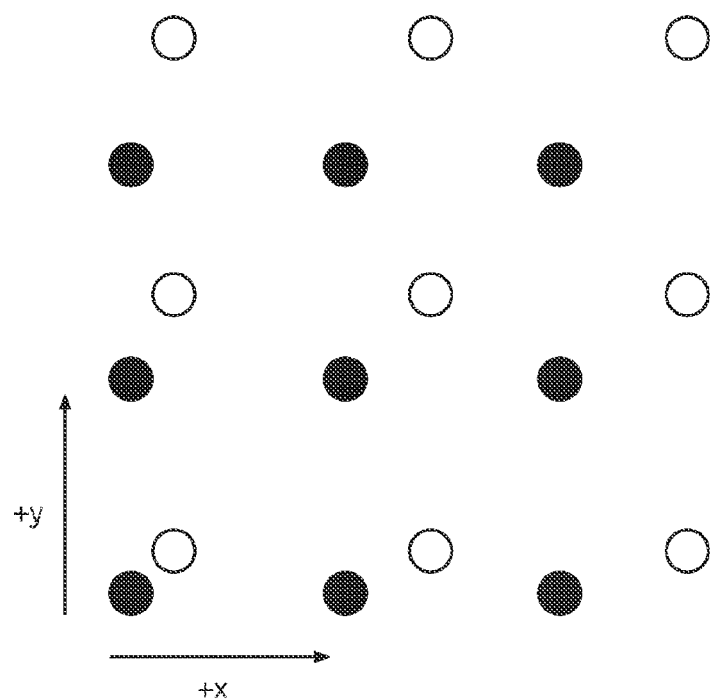

FIG. 14 is a diagram that depicts x-axis displacement, y-axis displacement, and full divergence. FIG. 14 corresponds to a condition where:

$g_x>0$;
$g_y>0$;

$$\frac{\partial g_x}{\partial x} > 0;$$

-continued $$\frac{\partial g_y}{\partial y} > 0; \text{ and}$$

$$\frac{\partial g_x}{\partial y} \text{ and } \frac{\partial g_y}{\partial x}$$

are both zero.

FIG. 15 is a diagram that depicts x-axis displacement, displacement growth along the x-axis, and displacement skew along the y-axis. FIG. 15 corresponds to a condition where:

$g_x>0$;
$g_y=0$;

$$\frac{\partial g_x}{\partial x} > 0;$$

$$\frac{\partial g_x}{\partial y} > 0; \text{ and}$$

$$\frac{\partial g_y}{\partial y} \text{ and } \frac{\partial g_y}{\partial x}$$

are both zero.

Figure 16:
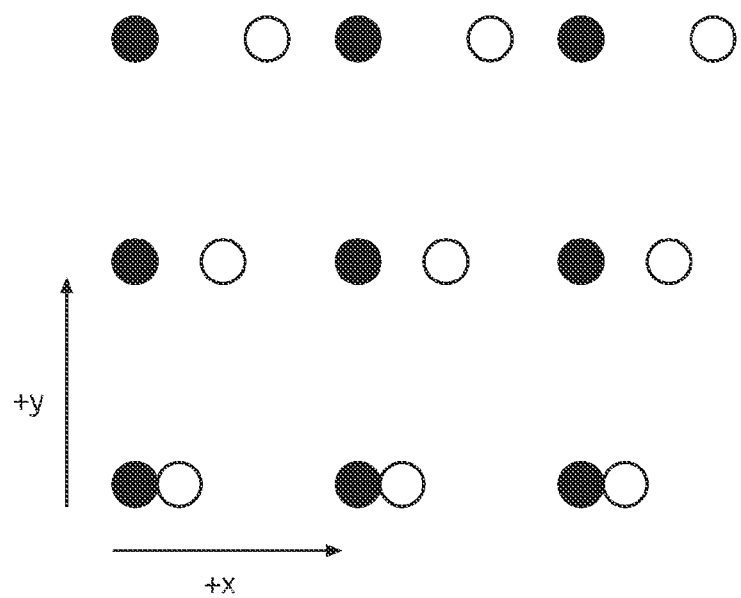

FIG. 16 is a diagram that depicts x-axis displacement and displacement skew along the y-axis. FIG. 16 corresponds to a condition where:

$g_x>0$;
$g_y=0$;

$$\frac{\partial g_x}{\partial y} > 0; \text{ and}$$

$$\frac{\partial g_x}{\partial x}, \frac{\partial g_y}{\partial y}, \text{ and } \frac{\partial g_y}{\partial x}$$

are all zero.

FIG. 17 is a diagram that depicts y-axis displacement, displacement growth along the y-axis, and displacement skew along the x-axis. FIG. 17 corresponds to a condition where:

$g_x=0$;
$g_y>0$;

$$\frac{\partial g_y}{\partial y} > 0;$$

$$\frac{\partial g_y}{\partial x} > 0; \text{ and}$$

$$\frac{\partial g_x}{\partial x} \text{ and } \frac{\partial g_x}{\partial y}$$

are both zero.

Figure 18:
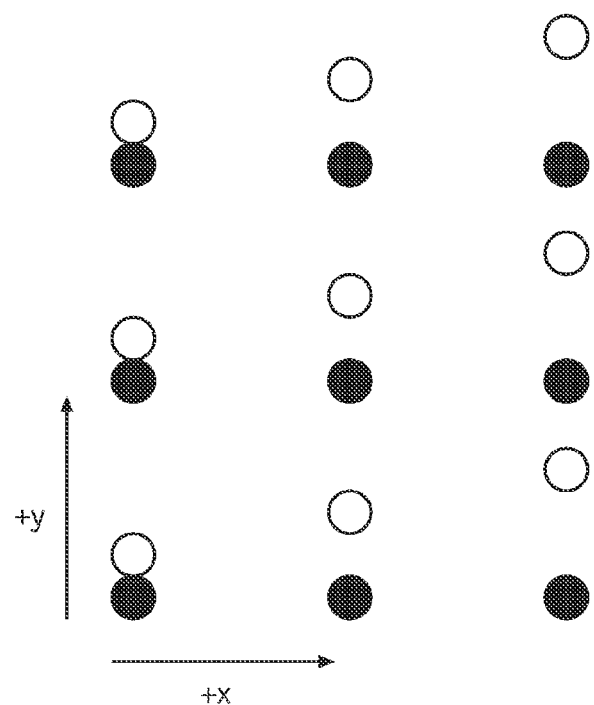

FIG. 18 is a diagram that depicts y-axis displacement and displacement skew along the x-axis. FIG. 18 corresponds to a condition where:

$g_x=0$;
$g_y>0$;

$$\frac{\partial g_y}{\partial x} > 0; \text{ and}$$

$$\frac{\partial g_x}{\partial x}, \frac{\partial g_y}{\partial y}, \text{ and } \frac{\partial g_x}{\partial y}$$

are all zero.

Figure 19:
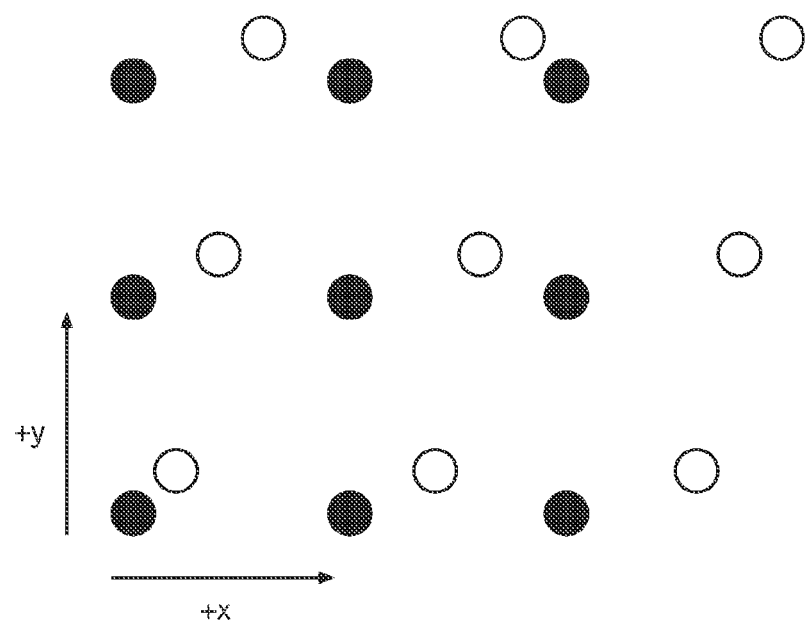

FIG. 19 is a diagram that depicts x-axis displacement, y-axis displacement, x-displacement growth along the x-axis, and x-displacement skew along the y-axis. FIG. 19 corresponds to a condition where:

$g_x>0$;
$g_y>0$;

$$\frac{\partial g_x}{\partial x} > 0;$$

$$\frac{\partial g_x}{\partial y} > 0; \text{ and}$$

$$\frac{\partial g_y}{\partial y} \text{ and } \frac{\partial g_y}{\partial x}$$

are both zero.

Figure 20:
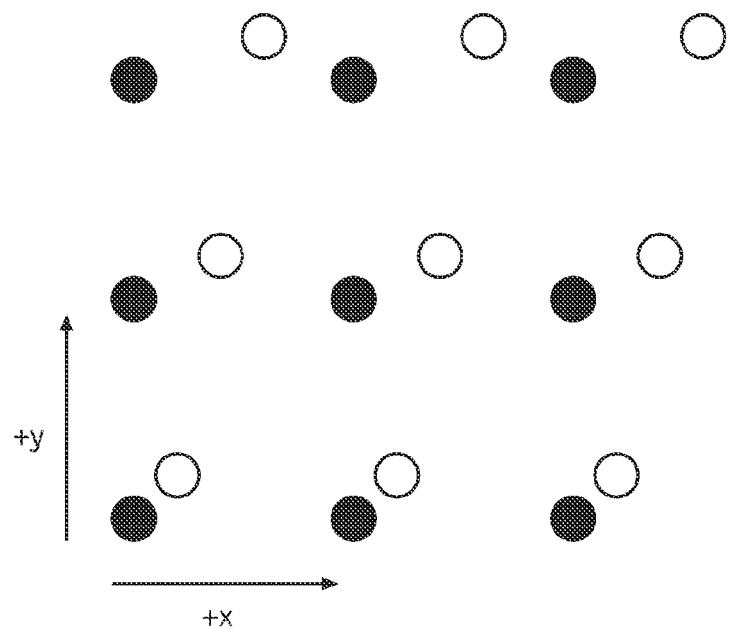

FIG. 20 is a diagram that depicts x-axis displacement, y-axis displacement, and x-displacement skew along the y-axis. FIG. 20 corresponds to a condition where:

$g_x>0$;
$g_y>0$;

$$\frac{\partial g_x}{\partial y} > 0; \text{ and}$$

$$\frac{\partial g_x}{\partial x}, \frac{\partial g_y}{\partial y} \text{ and } \frac{\partial g_y}{\partial x}$$

are all zero.

Figure 21:
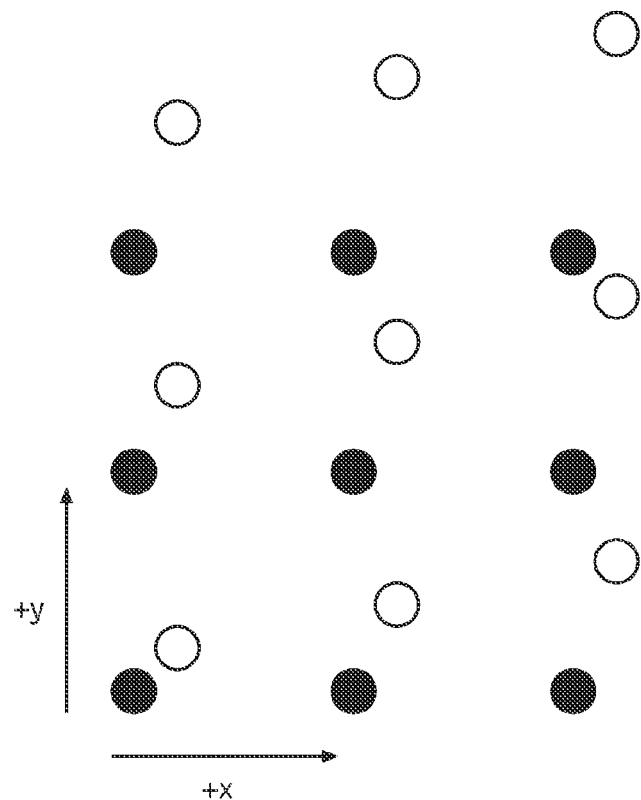

FIG. 21 is a diagram that depicts x-axis displacement, y-axis displacement, y-displacement growth along the y-axis, and y-displacement skew along the x-axis. FIG. 21 corresponds to a condition where:

$g_x>0$;

$g_y>0$;

$$\frac{\partial g_y}{\partial y} > 0;$$

$$\frac{\partial g_y}{\partial x} > 0; \text{ and}$$

$$\frac{\partial g_x}{\partial x} \text{ and } \frac{\partial g_x}{\partial y}$$

are both zero.

Figure 22:
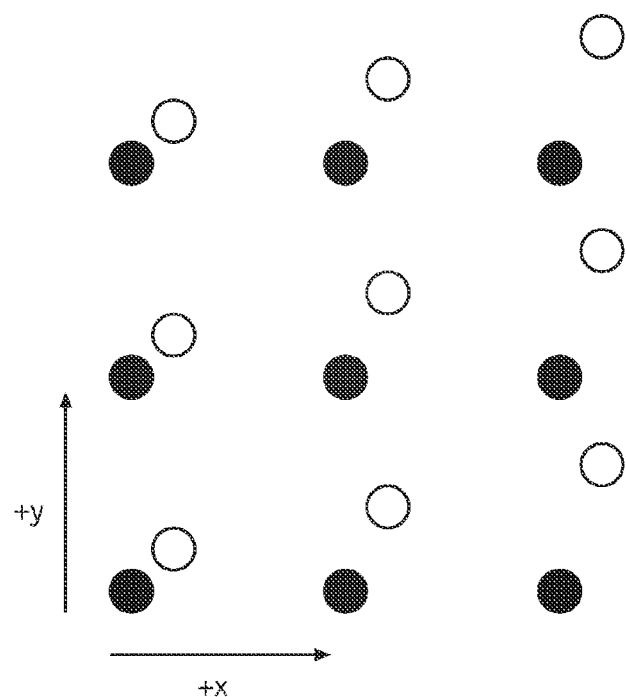

FIG. 22 is a diagram that depicts x-axis displacement, y-axis displacement, and y-displacement skew along the x-axis. FIG. 22 corresponds to a condition where:

$g_x>0$;

$g_y>0$;

$$\frac{\partial g_y}{\partial x} > 0; \text{ and}$$

$$\frac{\partial g_x}{\partial x}, \frac{\partial g_y}{\partial y} \text{ and } \frac{\partial g_x}{\partial y}$$

are all zero.

Figure 23:
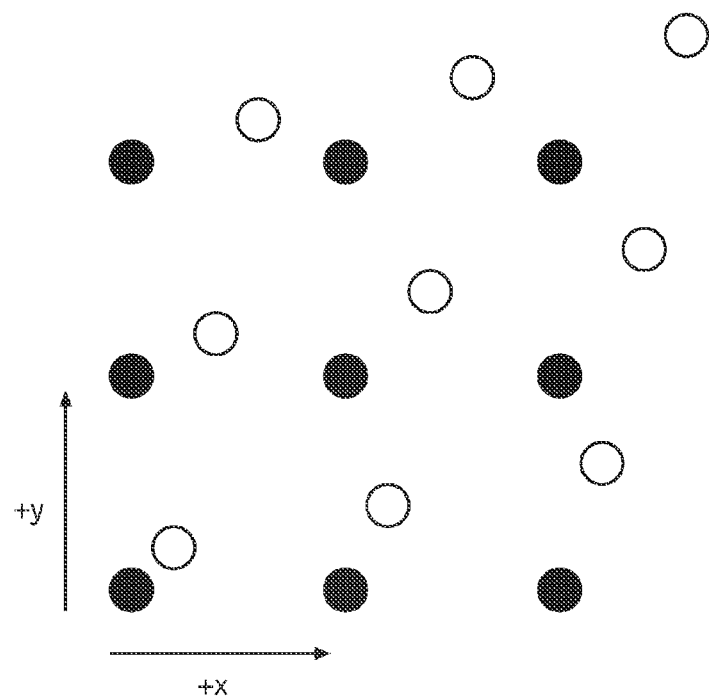

FIG. 23 is a diagram that depicts x-axis displacement, y-axis displacement, x-displacement skew along the y-axis, and y-displacement skew along the x-axis. FIG. 23 corresponds to a condition where:

$g_x>0$;

$g_y>0$;

$$\frac{\partial g_x}{\partial y} > 0;$$

$$\frac{\partial g_y}{\partial x} > 0; \text{ and}$$

$$\frac{\partial g_x}{\partial x} \text{ and } \frac{\partial g_y}{\partial y}$$

are both zero.

Figure 24:
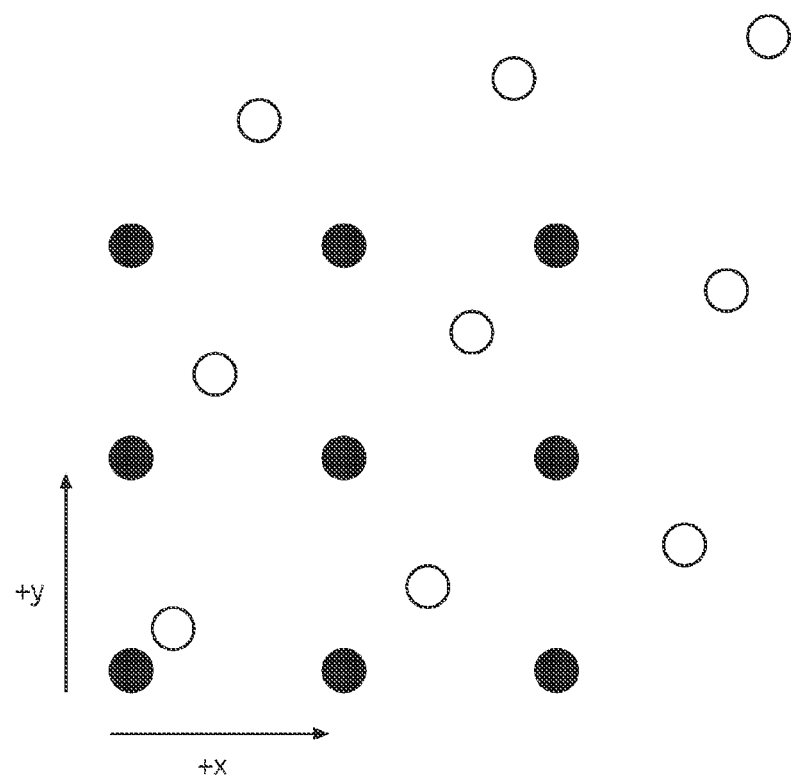

FIG. 24 is a diagram that depicts x-axis displacement, y-axis displacement, full divergence, and full curl. FIG. 24 corresponds to a condition where:

$g_x>0$;

$g_y>0$;

$$\frac{\partial g_x}{\partial x} > 0;$$

$$\frac{\partial g_y}{\partial y} > 0;$$

$$\frac{\partial g_x}{\partial y} > 0;$$

and $$\frac{\partial g_y}{\partial x} > 0.$$

Figure 25:
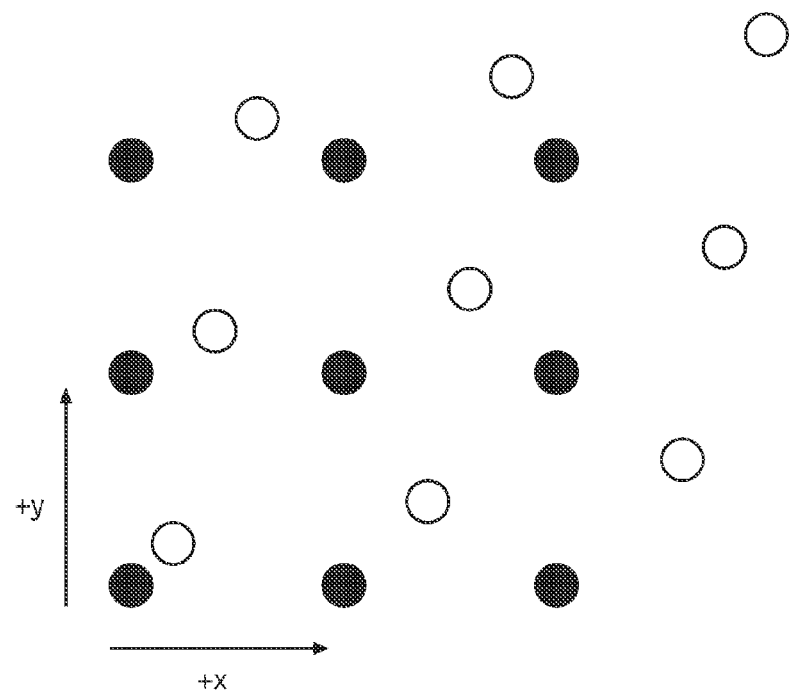

FIG. 25 is a diagram that depicts x-axis displacement, y-axis displacement, x-displacement growth along the x-axis, x-displacement skew along the y-axis, and y-displacement skew along the x-axis. FIG. 25 corresponds to a condition where:

$g_x>0$;

$g_y>0$;

$$\frac{\partial g_x}{\partial x} > 0;$$

$$\frac{\partial g_y}{\partial y} = 0;$$

$$\frac{\partial g_x}{\partial y} > 0;$$

and $$\frac{\partial g_y}{\partial x} > 0.$$

Figure 26:
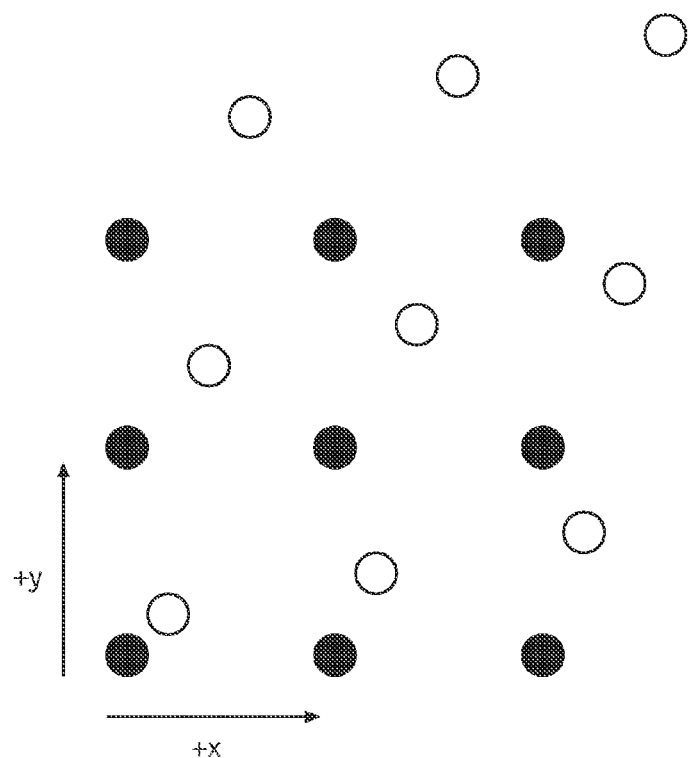

FIG. 26 is a diagram that depicts x-axis displacement, y-axis displacement, y-displacement growth along the y-axis, x-displacement skew along the y-axis, and y-displacement skew along the x-axis. FIG. 26 corresponds to a condition where:

$g_x>0$;

$g_y>0$;

$$\frac{\partial g_x}{\partial x} = 0;$$

$$\frac{\partial g_y}{\partial y} > 0;$$

$$\frac{\partial g_x}{\partial y} > 0;$$

and $$\frac{\partial g_y}{\partial x} > 0.$$

Figure 27:
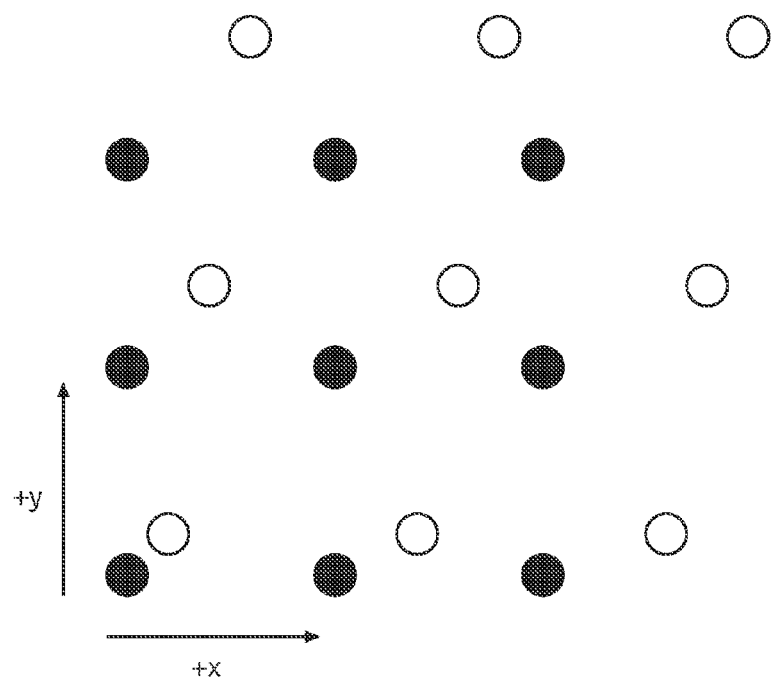

FIG. 27 is a diagram that depicts x-axis displacement, y-axis displacement, x-displacement growth along the x-axis, y-displacement growth along the y-axis, and x-displacement skew along the y-axis. FIG. 27 corresponds to a condition where:

$g_x > 0$;

$g_y > 0$;

$\frac{\partial g_x}{\partial x} > 0$;

$\frac{\partial g_y}{\partial y} > 0$;

$\frac{\partial g_x}{\partial y} > 0$;

and $\frac{\partial g_y}{\partial x} = 0$.

Figure 28:
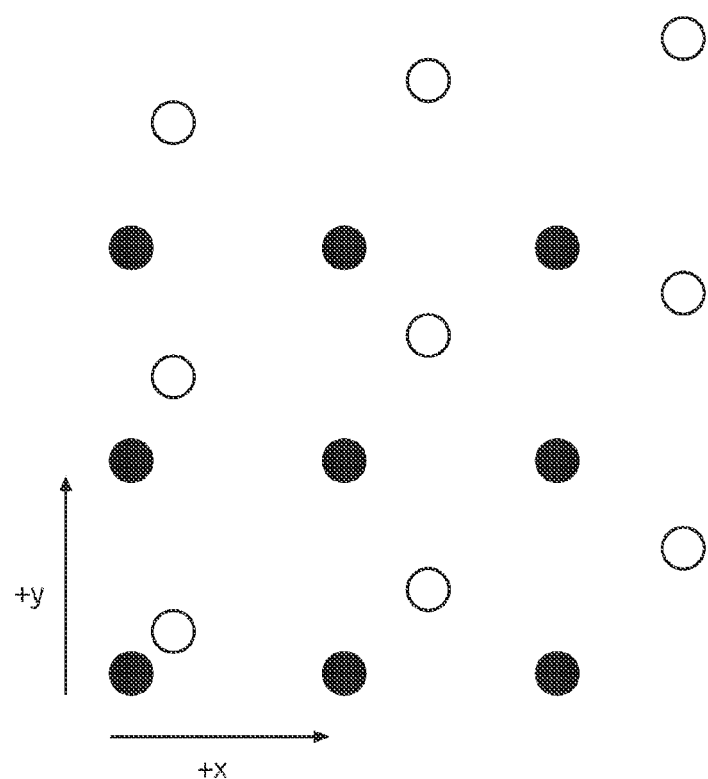

FIG. 28 is a diagram that depicts x-axis displacement, y-axis displacement, x-displacement growth along the x-axis, y-displacement growth along the y-axis, and y-displacement skew along the x-axis. FIG. 28 corresponds to a condition where:

$g_x > 0$;

$g_y > 0$;

$\frac{\partial g_x}{\partial x} > 0$;

$\frac{\partial g_y}{\partial y} > 0$;

$\frac{\partial g_x}{\partial y} = 0$;

and $\frac{\partial g_y}{\partial x} > 0$.

Figure 29:
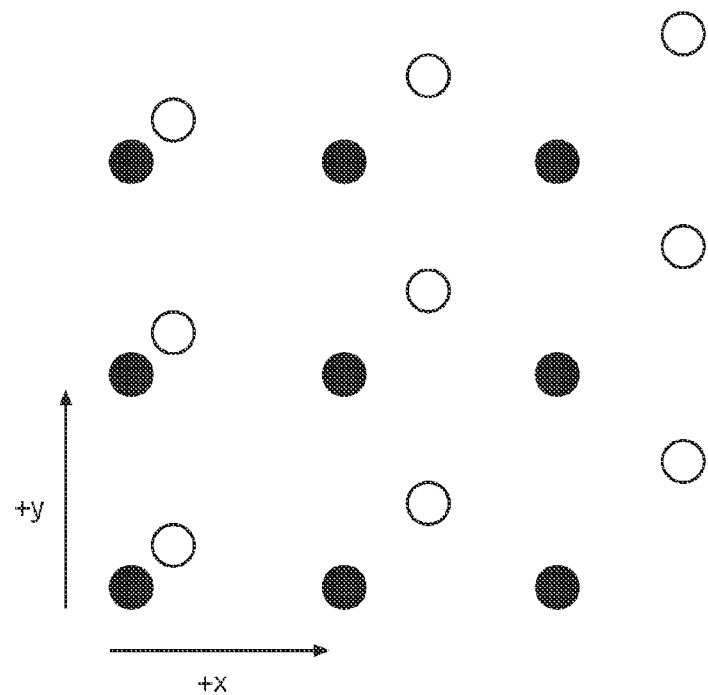

FIG. 29 is a diagram that depicts x-axis displacement, y-axis displacement, x-displacement growth along the x-axis, and y-displacement skew along the x-axis. FIG. 29 corresponds to a condition where:

$g_x > 0$;

$g_y > 0$;

$\frac{\partial g_x}{\partial x} > 0$;

$\frac{\partial g_y}{\partial x} > 0$; and $\frac{\partial g_y}{\partial y}$ and $\frac{\partial g_x}{\partial y}$ are both zero.

Figure 30:
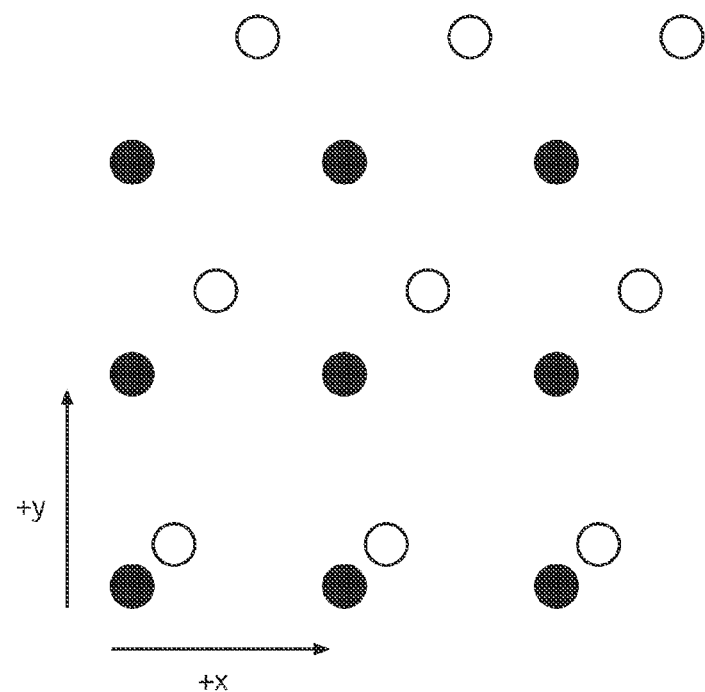

FIG. 30 is a diagram that depicts x-axis displacement, y-axis displacement, y-displacement growth along the y-axis, and x-displacement skew along the y-axis. FIG. 30 corresponds to a condition where:

$g_x > 0$;

$g_y > 0$;

$\frac{\partial g_y}{\partial y} > 0$;

$\frac{\partial g_x}{\partial y} > 0$; and $\frac{\partial g_x}{\partial x}$ and $\frac{\partial g_y}{\partial x}$ are both zero.

Figure 31:
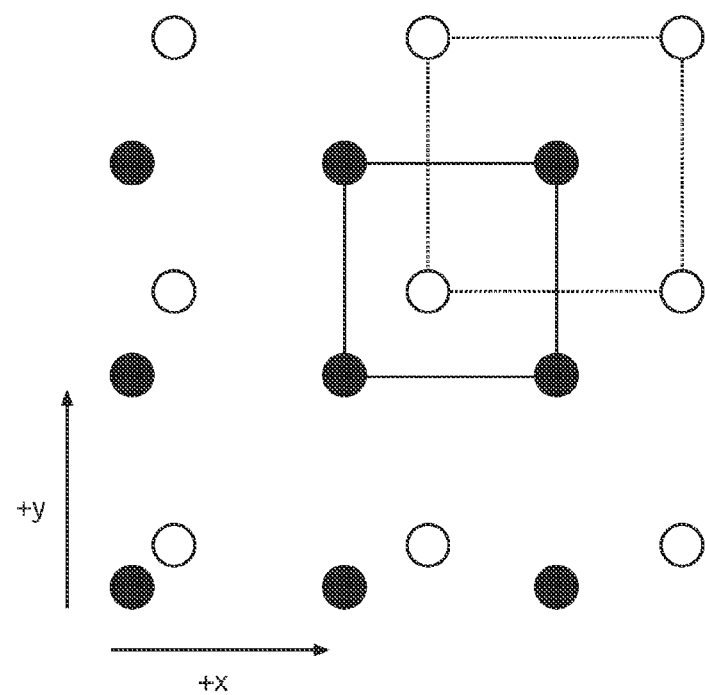

FIG. 31 is a diagram that depicts perceived growth in the test grid. Such growth makes the grid squares appear to be larger in both directions. FIG. 31 corresponds to a condition where:

$g_x > 0$;

$g_y > 0$;

$\frac{\partial g_x}{\partial x} > 0$;

$\frac{\partial g_y}{\partial y} > 0$; and $\frac{\partial g_x}{\partial y}$ and $\frac{\partial g_y}{\partial x}$ are both zero.

Figure 32:
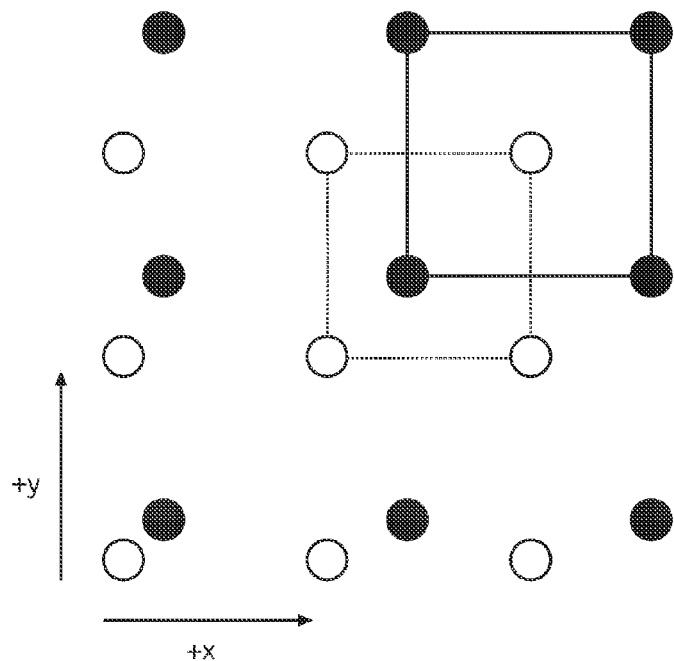

FIG. 32 is a diagram that depicts perceived shrinkage in the test grid. Such shrinkage makes the grid squares appear to be smaller in both directions. FIG. 32 corresponds to a condition where:

$g_x < 0$;

$g_y < 0$;

$\frac{\partial g_x}{\partial x} < 0$;

$\frac{\partial g_y}{\partial y} < 0$; and $\frac{\partial g_x}{\partial y}$ and $\frac{\partial g_y}{\partial x}$ are both zero.

It should be appreciated that the displacement elements $g_x$ and $g_y$, and the divergence elements $\frac{\partial g_x}{\partial x}$ and $\frac{\partial g_y}{\partial y}$ can be negative as well as positive. Notably, positive components were used in FIGS. 6-31 to illustrate the relative possible influences of each component on gridpoint appearance (and in a very simple manner at that). These components can certainly be negative as well as positive, depending upon the particular transparency.

The above description of optical distortion evaluation process 500 assumed that the reference image is taken with no transparency in place and that the test image is taken through the transparency under test. It should be noted that the techniques and technologies described herein can be utilized to compare any two images, and one of the images need not correspond to an unobstructed view of the test grid structure. For example, as mentioned above, the test image may be of an unframed transparency (loaded or unloaded), a loosely framed transparency (loaded or unloaded), or a framed and sealed transparency (loaded or unloaded). Moreover, the reference image may instead correspond to an electronic baseline image through the transparency under test subjected to a first condition, and the test image may correspond to an image through the same transparency under test subjected to a second condition. For example, the first condition may be a loosely framed condition (where the transparency is surrounded by its frame in an unsecured and unsealed manner) and the second condition may be a sealed framed condition. This type of test can determine whether the assembly process has introduced any measurable optical distortion. As another example, the first condition may be a framed and unloaded condition and the second condition may be a framed and loaded condition, where desired forces are applied to the transparency under test. In this regard, the transparency under test may be loaded with inwardly directed force (distributed or point forces) along its side rails to simulate static and/or dynamic loading that might occur after installation in an aircraft. This type of test can determine whether the transparency under test may generate optical distortions under various flight conditions.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for evaluating optical distortion in a transparency, the method comprising:

obtaining an electronic reference image comprising a digital image of a structure having a plurality of visible index locations, the entire electronic reference image being obtained simultaneously from a fixed imaging location relative to the structure, said electronic reference image obtained at a first time without a transparency under test comprising said image; obtaining an electronic test image comprising a digital image of the structure, the entire electronic test image being obtained simultaneously from the fixed imaging location and through said transparency under test, said electronic reference test obtained at a second time different from said first time; computing displacement characteristics for the visible index locations, the displacement characteristics being based upon reference positions of the visible index locations captured in the electronic reference image and corresponding test positions of the visible index locations captured in the electronic test image, said computing comprising calculating a relative x-axis displacement $g_x$ and y-axis displacement $g_y$ of a respective test position as a function of the determinant curl elements; said computing by a computing device, said computing device comprising processing logic and/or processing instructions residing in computer readable media; and generating optical distortion measurement data for the transparency under test, the optical distortion measurement data being based upon the displacement characteristics, said generating by a computing device, said computing device comprising processing logic and/or processing instructions residing in computer readable media.

2. A method according to claim 1, wherein obtaining the electronic reference image comprises obtaining an unobstructed electronic reference image of the structure.

3. A method according to claim 1, wherein:

obtaining the electronic reference image comprises obtaining an electronic baseline image through the transparency under test subjected to a first condition; and obtaining the electronic test image comprises obtaining the electronic test image through the transparency under test subjected to a second condition.

4. A method according to claim 3, wherein:

the first condition is a loosely framed condition; and the second condition is a sealed framed condition.

5. A method according to claim 3, wherein:

the first condition is a framed and unloaded condition; and the second condition is a framed and loaded condition.

6. A method according to claim 1, wherein the transparency under test is a windshield.

7. A method according to claim 1, wherein the transparency under test is a vehicle canopy.

8. A method according to claim 1, further comprising:

obtaining a second electronic reference image of the structure, the second electronic reference image being obtained from the fixed imaging location, and the second electronic reference image being obtained after obtaining the electronic test image;

computing second displacement characteristics for the visible index locations, the second displacement characteristics being based upon the reference positions of the visible index locations captured in the electronic reference image and corresponding second reference positions of the visible index locations captured in the second electronic test image; and generating optical distortion reference measurement data for the transparency under test, the optical distortion reference measurement being based upon the second displacement characteristics.

9. A method according to claim 1, wherein computing displacement characteristics comprises calculating x-axis displacement elements ($g_x$) and y-axis displacement elements ($g_y$) for the visible index locations.

10. A method according to claim 9, wherein computing displacement characteristics comprises calculating x-axis divergence elements $$\left(\frac{\partial g_x}{\partial x}\right)$$

and y-axis divergence elements $$\left(\frac{\partial g_y}{\partial y}\right)$$

for the visible index locations.

11. A method according to claim 9, wherein computing displacement characteristics comprises calculating first curl elements $$\left(\frac{\partial g_x}{\partial y}\right)$$

and second curl elements $$\left(\frac{\partial g_y}{\partial x}\right)$$

for the visible index locations.

12. A method according to claim 1, further comprising correlating the displacement characteristics to optical distortion characteristics of the transparency under test, wherein the optical distortion measurement data is influenced by the correlating step.

13. A method according to claim 1, further comprising rating the transparency under test in response to the optical distortion measurement data.

14. A system for evaluating optical distortion in a transparency, the system comprising:
a digital imaging device configured to obtain an electronic reference digital image of a structure having a plurality of visible index locations, the electronic reference image being obtained from a fixed imaging location relative to the structure, said entire electronic reference image obtained simultaneously at a first time without a transparency under test comprising said image, and the digital imaging device being configured to obtain an electronic test digital image of the structure, the entire electronic test image being obtained simultaneously from the fixed imaging location and through said transparency under test at a second time different from said first time; and
a computing device configured to receive the electronic reference image and the electronic test image, the computing device comprising a processor having processing logic configured to analyze the electronic reference image and the electronic test image to generate optical distortion measurement data for the transparency under test based upon computed displacement characteristics of test positions of the visible index locations captured in the electronic test image, said processing logic comprising instructions to calculate a relative x-axis displacement $g_x$ and y-axis displacement $g_y$ of a respective test position as a function of the determinant curl elements.

15. A system according to claim 14, wherein the transparency under test is a windshield.

16. A system according to claim 14, wherein the transparency under test is a vehicle canopy.

17. A system according to claim 14, wherein the processing logic of the computing device is configured to compute the displacement characteristics by calculating x-axis displacement elements ($g_x$) and y-axis displacement elements ($g_y$) for the visible index locations.

18. A system according to claim 17, wherein the processing logic of the computing device is configured to compute the displacement characteristics by calculating x-axis divergence elements $$\left(\frac{\partial g_x}{\partial x}\right)$$

and y-axis divergence elements $$\left(\frac{\partial g_y}{\partial y}\right)$$

for the visible index locations.

19. A system according to claim 14, further comprising a display element coupled to the computing device, wherein the computing device and the display element are configured to render a simulated representation of optical distortion caused by the transparency under test, based upon the optical distortion measurement data.

20. A system according to claim 19, wherein the simulated representation of optical distortion is an animated representation.

21. A non-transitory computer-readable medium having computer-executable instructions for performing steps comprising:
obtaining an electronic reference image comprising a digital image of a structure having a plurality of visible index locations, the entire electronic reference image being obtained simultaneously from a fixed imaging location relative to the structure, said electronic reference image obtained at a first time without a transparency under test comprising said image;
obtaining an electronic test image comprising a digital image of the structure, the entire electronic test image being obtained simultaneously from the fixed imaging location and through said transparency under test, said electronic reference test obtained at a second time different form said first time;
computing displacement characteristics for the visible index locations, the displacement characteristics being based upon reference positions of the visible index locations captured in the electronic reference image and corresponding test positions of the visible index locations captured in the electronic test image; and
generating optical distortion measurement data for the transparency under test, the optical distortion measurement data being based upon the displacement characteristics, said processing logic comprising calculating a relative x-axis displacement $g_x$ and y-axis displacement $g_y$ of a respective test position as a function of the determinant curl elements.

22. A non-transitory computer-readable medium according to claim 21, further comprising computer-executable instructions for correlating the displacement characteristics to optical distortion characteristics of the transparency under test, wherein the optical distortion measurement data is influenced by the correlating step.

23. A non-transitory computer-readable medium according to claim 21, further comprising computer-executable instructions for rating the transparency under test in response to the optical distortion measurement data.

24. A non-transitory computer-readable medium according to claim 21, further comprising computer-executable instructions for rendering a simulated representation of optical distortion caused by the transparency under test, based upon the optical distortion measurement data.

25. A non-transitory computer-readable medium according to claim 21, wherein the processing logic of the computing device is configured to compute the displacement characteristics by calculating x-axis displacement elements ($g_x$) and y-axis displacement elements ($g_y$) for the visible index locations.

26. A non-transitory computer-readable medium according to claim 25, wherein the processing logic of the computing device is configured to compute the displacement characteristics by calculating x-axis divergence elements $$\left(\frac{\partial g_x}{\partial x}\right)$$

and y-axis divergence elements $$\left(\frac{\partial g_y}{\partial y}\right)$$

for the visible index locations.

* * * * *